(12) United States Patent
Fujita

(10) Patent No.: US 7,561,239 B2
(45) Date of Patent: Jul. 14, 2009

(54) LIQUID CRYSTAL DEVICE AND ELECTRONIC APPARATUS

(75) Inventor: Shin Fujita, Suwa (JP)

(73) Assignee: Epson Imaging Devices Corporation, Azumino (JP)

( * ) Notice: Subject to any disclaimer, the term of this patent is extended or adjusted under 35 U.S.C. 154(b) by 87 days.

(21) Appl. No.: 11/704,197

(22) Filed: Feb. 9, 2007

(65) Prior Publication Data

US 2007/0229748 A1 Oct. 4, 2007

(30) Foreign Application Priority Data

Mar. 29, 2006 (JP) .............................. 2006-090375

(51) Int. Cl.
G02F 1/1343 (2006.01)
(52) U.S. Cl. ...................................... 349/142; 349/145
(58) Field of Classification Search ................. 349/142, 349/143, 145
See application file for complete search history.

(56) References Cited

U.S. PATENT DOCUMENTS

| 6,466,290 | B2 | 10/2002 | Kim et al. | |
|---|---|---|---|---|
| 6,577,368 | B1 | 6/2003 | Yuh et al. | |
| 6,646,707 | B2 | 11/2003 | Noh et al. | |
| 6,762,816 | B1 | 7/2004 | Yamakita et al. | |
| 6,816,222 | B2 | 11/2004 | Ono et al. | |
| 6,862,067 | B2 * | 3/2005 | Matsumoto et al. | 349/141 |
| 7,139,058 | B2 | 11/2006 | Son et al. | |
| 7,256,855 | B2 | 8/2007 | Baek | |
| 7,333,170 | B2 | 2/2008 | Baek | |
| 2005/0041182 | A1 | 2/2005 | Ono et al. | |
| 2006/0256269 | A1 | 11/2006 | Son et al. | |
| 2007/0109329 | A1 | 5/2007 | Roh et al. | |

FOREIGN PATENT DOCUMENTS

| CN | 1359026 A | 10/2001 |
|---|---|---|
| CN | 1612024 A | 10/2004 |
| JP | A-2001-235763 | 8/2001 |
| JP | A-2001-306023 | 11/2001 |
| JP | A-2002-182230 | 6/2002 |
| JP | 2005-156899 A | 6/2005 |
| KR | 1999-0074556 | 10/1999 |

(Continued)

OTHER PUBLICATIONS

New U.S. Appl. No. 11/640,838, filed Dec. 19, 2006 in the name of Shin Fujita.

(Continued)

Primary Examiner—Jerry T Rahll
(74) Attorney, Agent, or Firm—Oliff & Berridge, PLC

(57) ABSTRACT

A liquid crystal device includes a substrate having unit pixels, each of which includes a plurality of subpixels arranged in a plurality of rows and a plurality of columns. The substrate includes switching elements, a first insulating film disposed at least on the switching elements, a first transparent electrode disposed on the first insulating film, a second transparent electrode disposed on the second insulating film, having a plurality of slits corresponding to each one of the subpixels, and generating an electric field through the slits between the first and second transparent electrodes. The direction in which a long side of each of the slits extends is defined to be different from the direction in which the columns extend.

9 Claims, 16 Drawing Sheets

FOREIGN PATENT DOCUMENTS

| | | |
|---|---|---|
| KR | 2001-0063288 A | 7/2001 |
| KR | 2002-0002055 A | 1/2002 |
| KR | 2002-0015046 A | 2/2002 |
| KR | 2002-0063498 A | 8/2002 |
| KR | 10-2005-0053885 A | 6/2005 |
| KR | 10-2005-0056701 A | 6/2005 |
| KR | 10-2005-0066578 | 6/2005 |

OTHER PUBLICATIONS

New U.S. Appl. No. 11/652,623, filed Jan. 12, 2007 in the name of Shin Fujita et al.

New U.S. Appl. No. 11/703,717, filed Feb. 8, 2007 in the name of Shin Fujita.

* cited by examiner

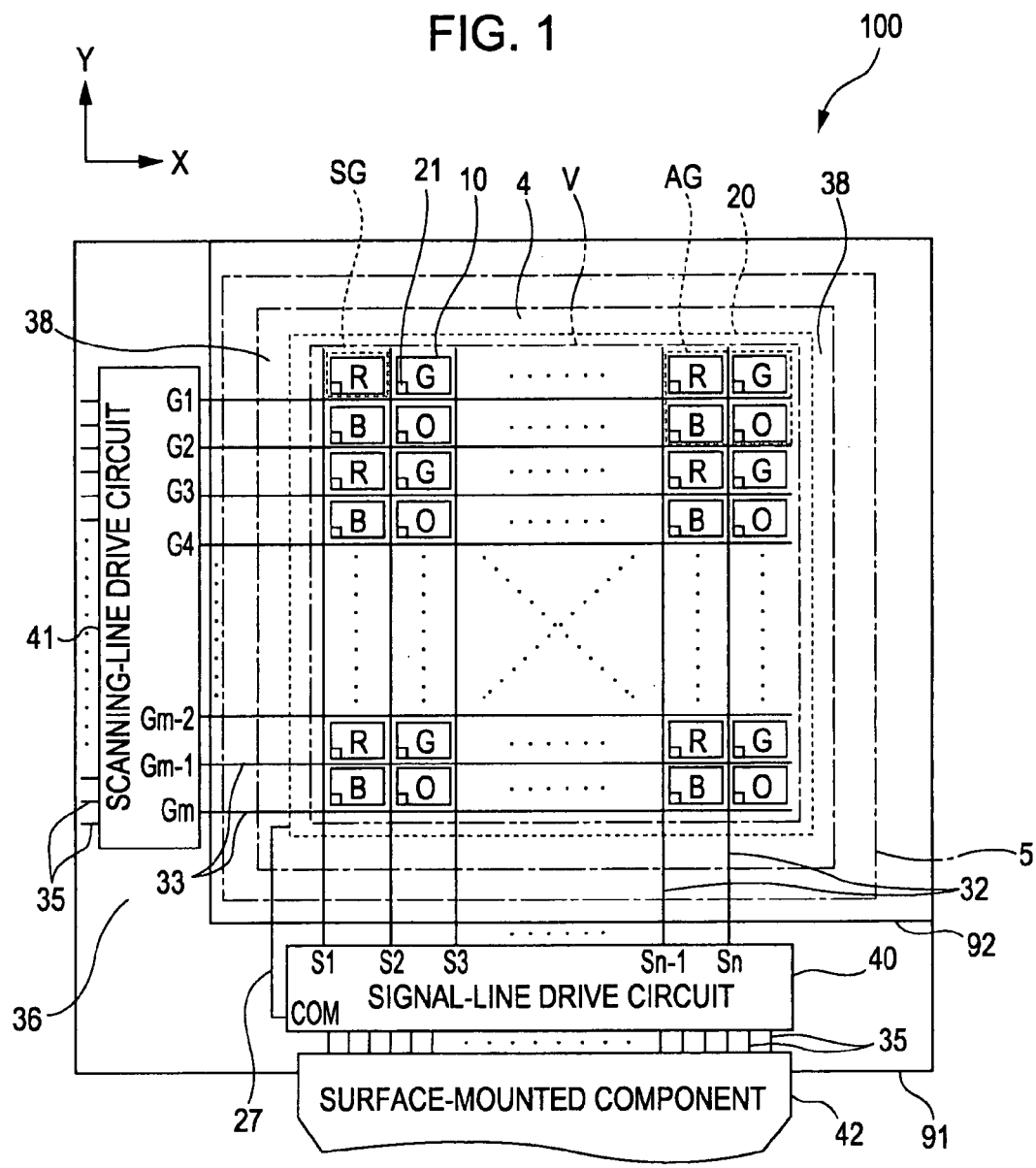

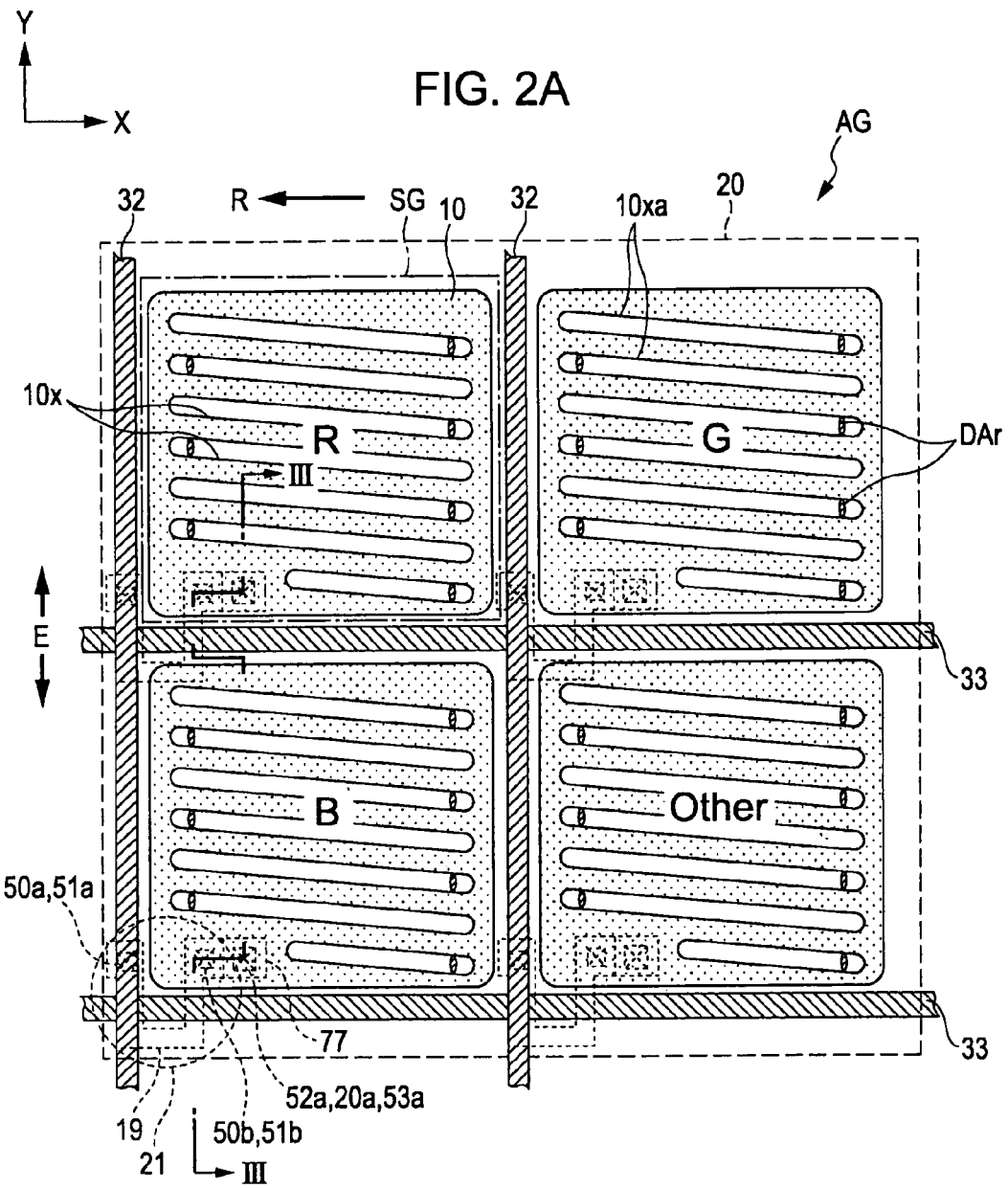

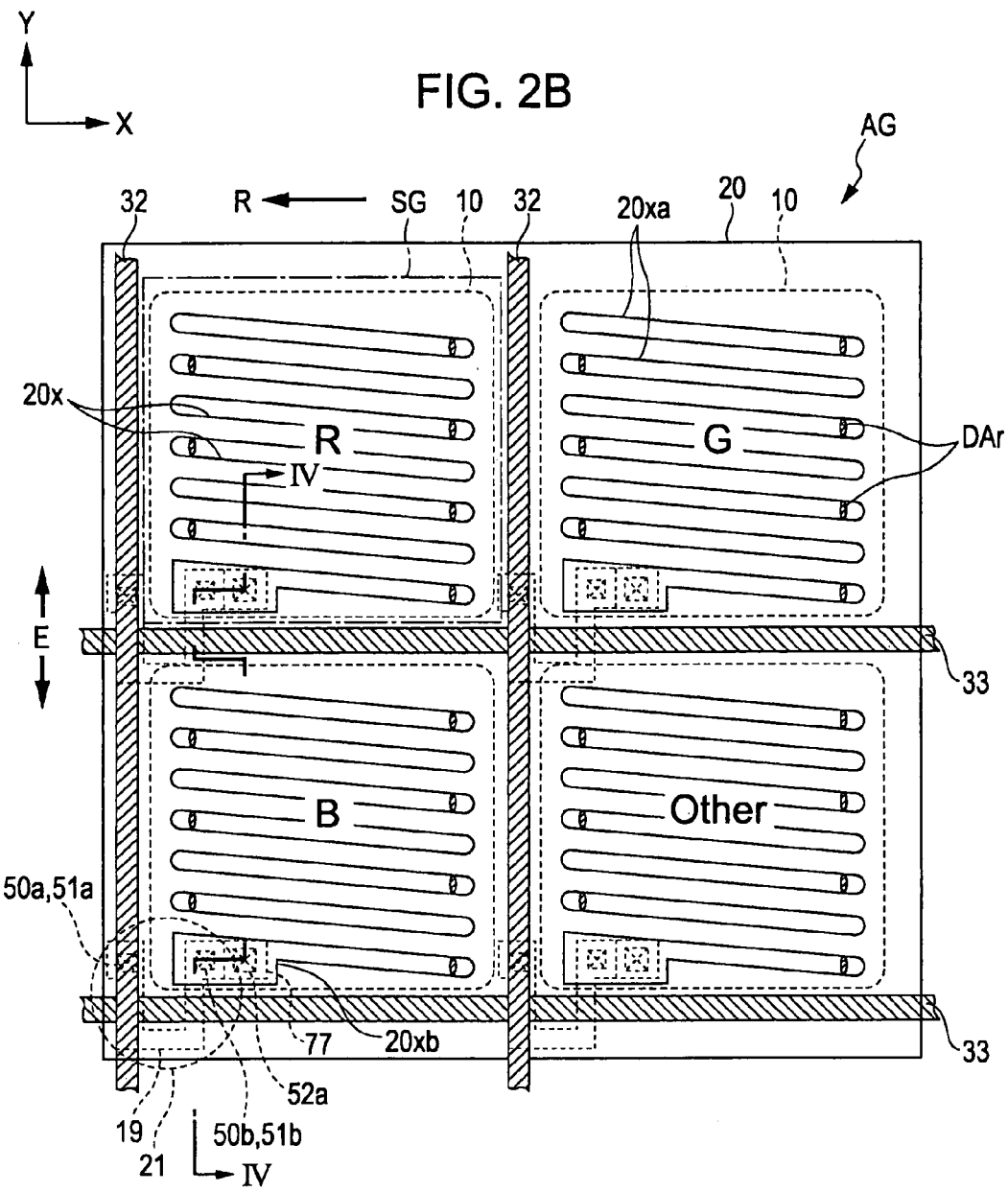

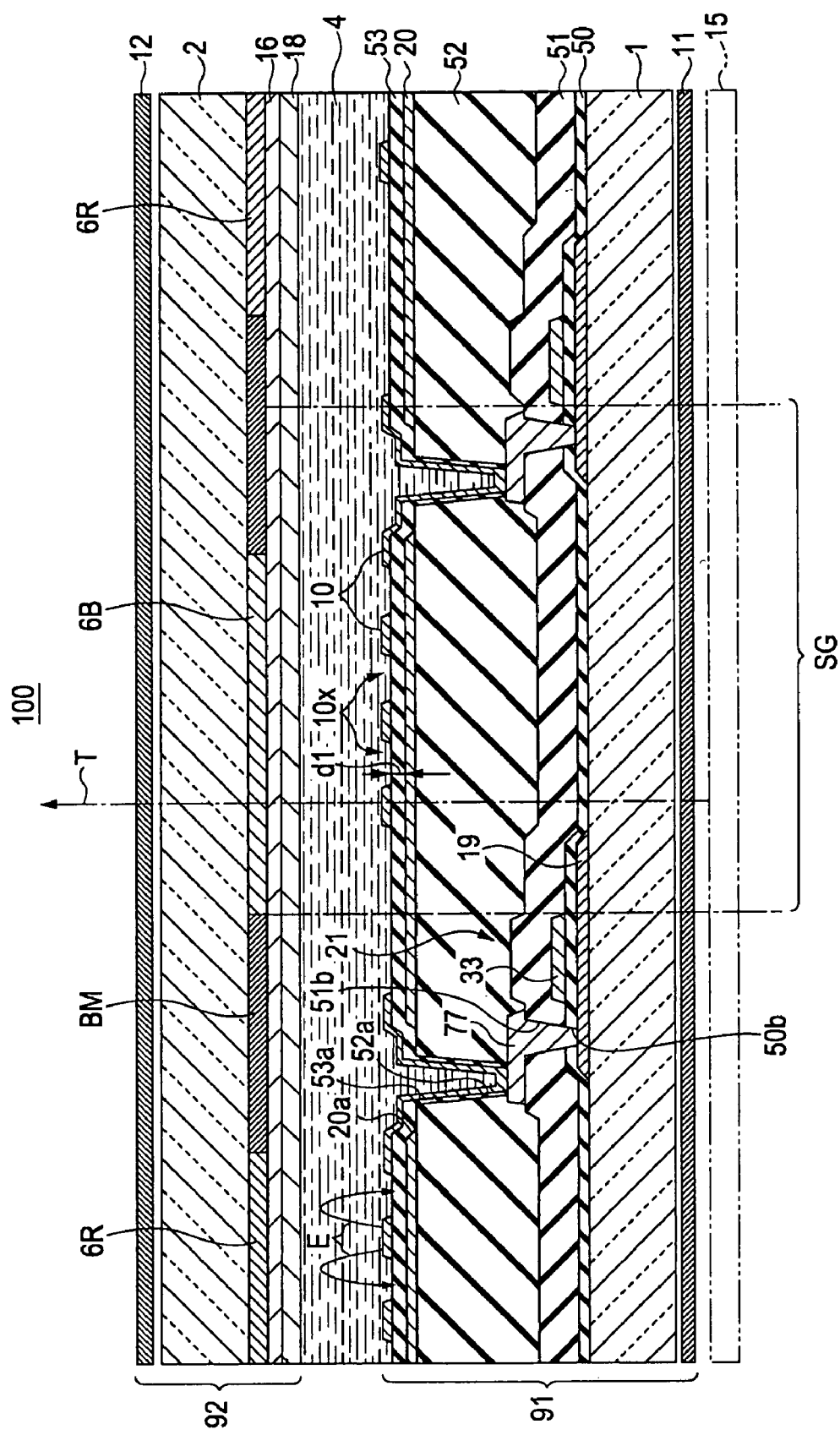

COMPARATIVE EXAMPLE

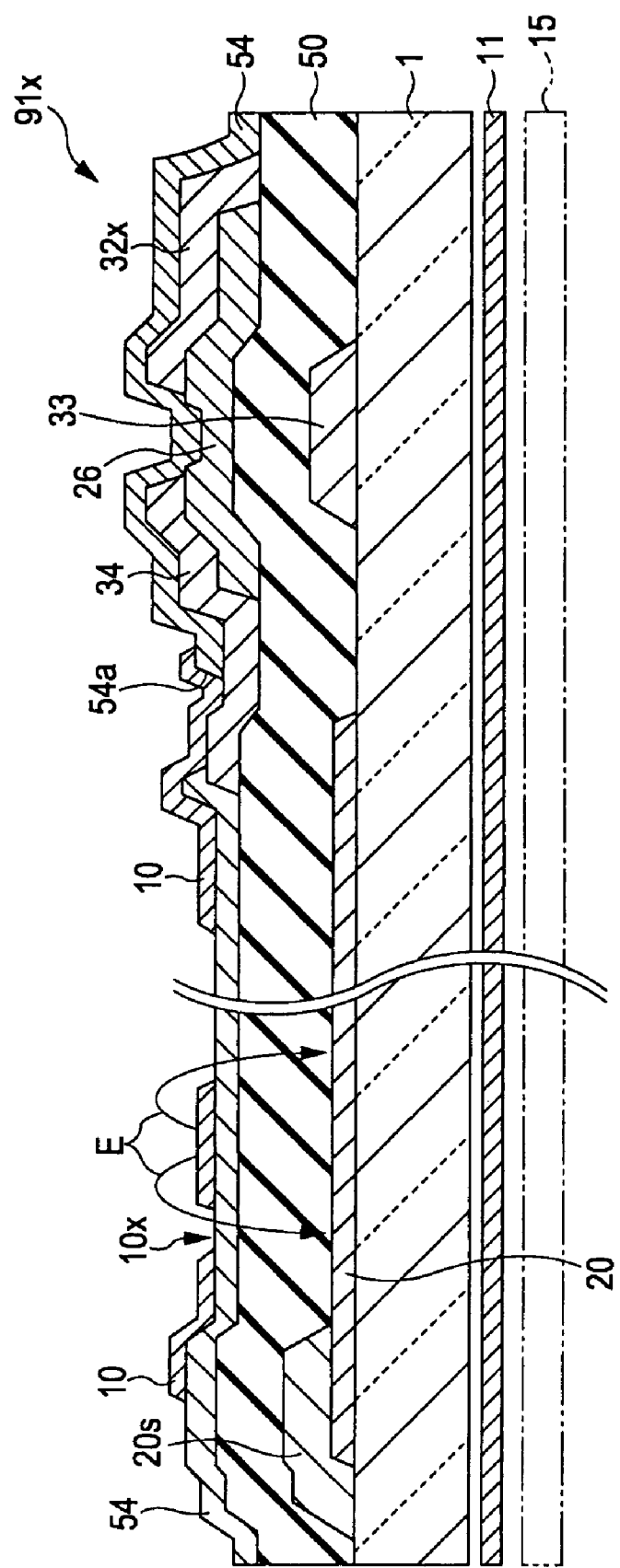

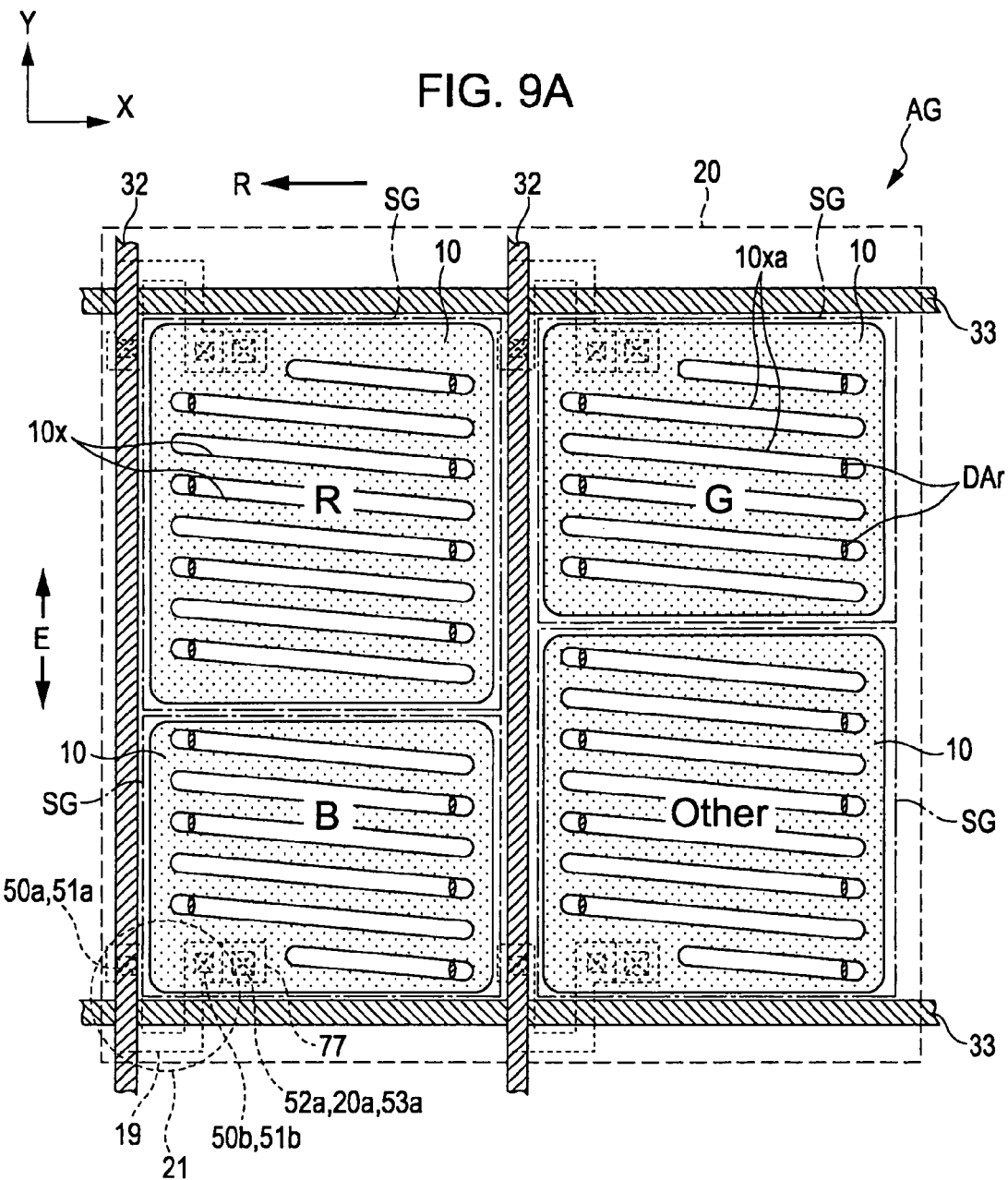

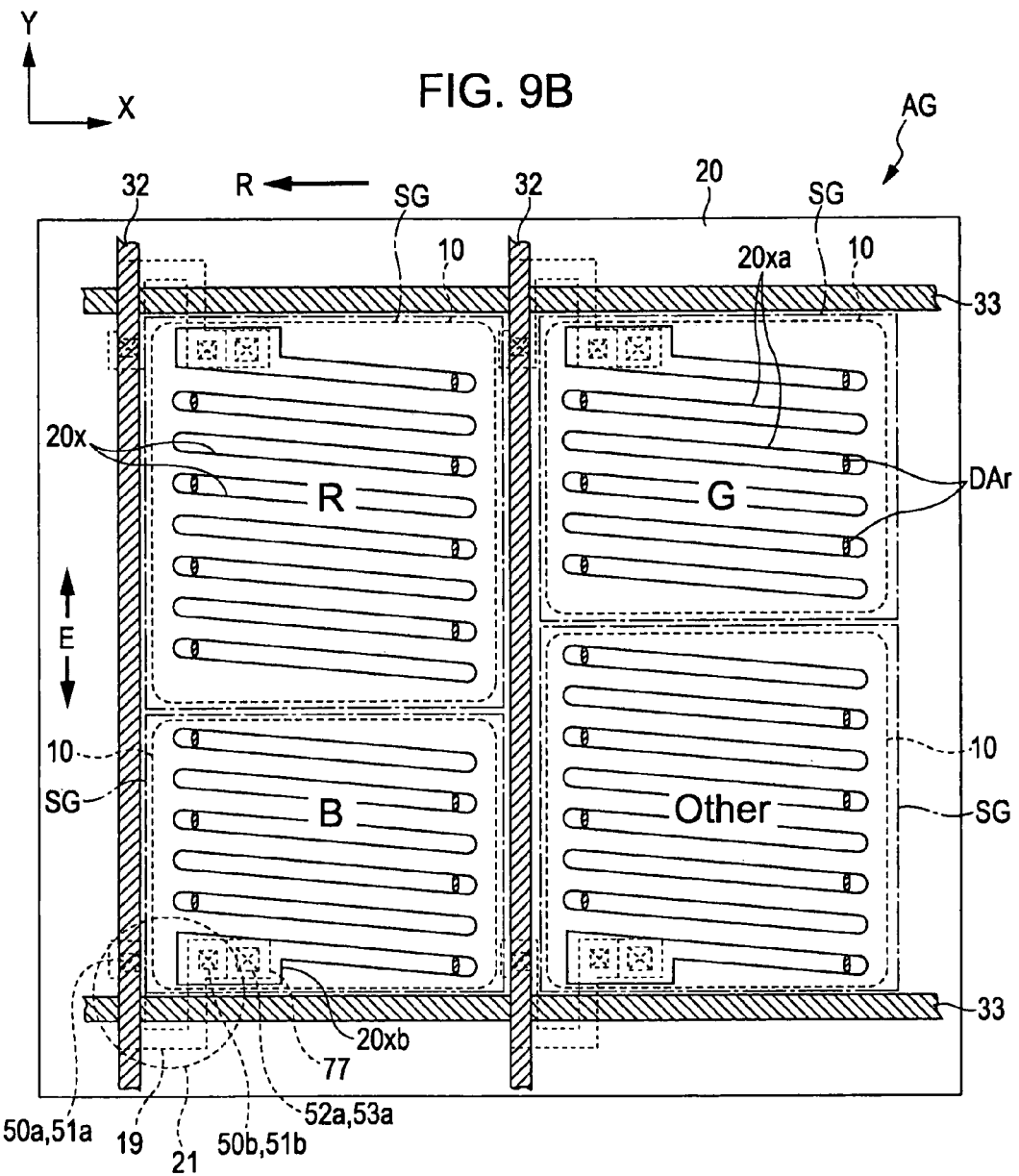

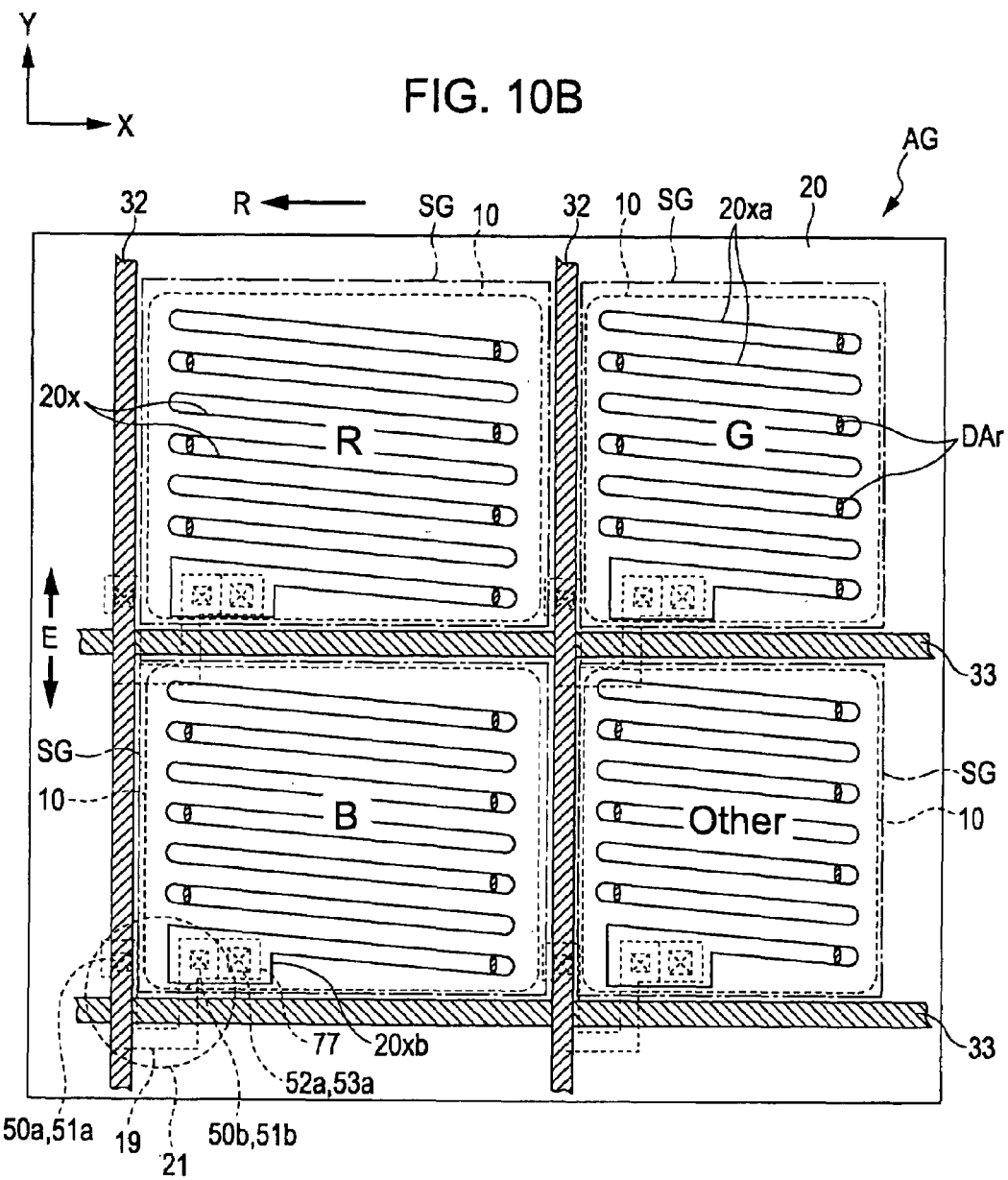

LIQUID CRYSTAL DEVICE AND ELECTRONIC APPARATUS

BACKGROUND

1. Technical Field

The present invention relates to liquid crystal devices for use in displaying various types of information and to electronic apparatuses.

2. Related Art

Generally, liquid crystal display modes can be classified into the following three types: twisted nematic (TN) mode; vertical alignment mode intended to increase the viewing angle and contrast; and transverse electric field mode represented by in-plane switching (IPS) mode or fringe field switching (FFS) mode.

Among these modes, IPS mode is a mode in which the direction of electric field applied to liquid crystal is substantially parallel to a substrate. IPS mode is advantageous over TN mode or the like in that IPS mode can improve viewing angle characteristics.

However, in such a liquid crystal device, pixel electrodes made of a transparent conductive material such as indium tin oxide (ITO) or the like and a common electrode for generating a transverse electric field between the common electrode and the pixel electrodes are disposed in the same layer. Liquid crystal molecules located above the pixel electrodes are not sufficiently driven, resulting in a reduction in transmittance or the like.

With regard to this point, FFS mode is advantageous in that, since a layer in which a common electrode is disposed is below a layer in which pixel electrodes are disposed, a transverse electric field can be applied to liquid crystal molecules located above the pixel electrodes, thereby sufficiently driving the liquid crystal molecules located at these positions. As a result, FFS mode has an advantage over the above-described IPS mode because FFS mode can improve transmittance and the like.

Liquid crystal devices in the above-described FFS mode are described in JP-A-2001-235763 and JP-A-2002-182230.

The liquid crystal devices described in these patent documents are liquid crystal devices in FFS mode in which amorphous silicon (($\alpha$-Si) thin film transistors (TFTs) are used. In the liquid crystal device described in the latter patent document (JP-A-2002-182230), pixel electrodes have a vertically long shape (vertical stripes) with a long side extending in the direction in which data bus lines extend and a short side extending in the direction in which gate bus lines extend. Each of the pixel electrodes has a plurality of slits for generating a fringe field (transverse electric field) between the pixel electrodes and a counter electrode (common electrode) disposed in a lower layer.

In these liquid crystal devices, colored layers corresponding to the primary colors red (R), green (G), and blue (B) are generally provided in corresponding pixel electrodes. A voltage according to a grayscale level is applied to each of the pixel electrodes corresponding to the colors to adjust the transmittance of the pixel electrodes, thereby displaying a complex intermediate color. In recent years, an image display apparatus capable of displaying a wide range of colors is proposed. Such an image display apparatus has, besides the colored layers corresponding to the three primary colors R, G, and B, an additional colored layer corresponding to cyan (C), which is a complementary color. An exemplary image display apparatus is described in JP-A-2001-306023.

In the liquid crystal device described in JP-A-2002-182230, the pixel electrodes are vertical stripes, and slits are arranged at a predetermined angle so as to be symmetrical about the center of each of the pixel electrodes in the long-side direction. As a result, the number of slits is increased.

In a general liquid crystal device in FFS mode, when liquid crystal is driven, application of a fringe field is changed in the vicinity of one of two ends of each of slits in a pixel electrode, compared with other regions away from the end of the slit. This results in a generation of a domain region where liquid crystal molecules are hardly driven (liquid crystal alignment abnormal region). In such a domain region, brightness is reduced, and the domain region seems as a dark region when displayed. Phenomenally, the number of such domain regions is the number of slits, and such domain regions are generated in an alternating zigzag pattern in the adjacent slits. Since the pixel structure in the liquid crystal device described in JP-A-2002-182230 is such that the number of slits is large, domain regions that do not contribute to brightness increases in number, and hence, the transmittance of the liquid crystal device is greatly reduced.

SUMMARY

An advantage of some aspects of the invention is that it provides a liquid crystal device in FFS mode having a pixel structure capable of reducing the number of domain regions causing a reduction in transmittance, and an electronic apparatus using the same.

According to an aspect of the invention, there is provided a liquid crystal device including a substrate having unit pixels, each of which includes a plurality of subpixels arranged in a plurality of rows and a plurality of columns. The substrate includes switching elements, a first insulating film disposed at least on the switching elements, a first transparent electrode disposed on the first insulating film, a second insulating film disposed on the first transparent electrode, and a second transparent electrode disposed on the second insulating film, having a plurality of slits corresponding to each one of the subpixels, and generating an electric field through the slits between the first and second transparent electrodes. The direction in which a long side of each of the slits extends is defined to be different from the direction in which the columns extend.

The above-described liquid crystal device includes a substrate having unit pixels, each of which includes a plurality of subpixels arranged in a plurality of rows and a plurality of columns. An exemplary pixel structure includes each unit pixel having subpixels arranged in rows and columns of a matrix. The substrate includes switching elements; a first insulating film disposed at least on the switching elements, the first insulating film being made of, for example, a transparent acrylic resin or the like; a first transparent electrode disposed on the first insulating film; a second insulating film disposed on the first transparent electrode, the second insulating film being made of, for example, silicon dioxide ($SiO_2$) or silicon nitride (SiNx); and a second transparent electrode disposed on the second insulating film, having a plurality of slits corresponding to each one of the subpixels, and generating an electric field through the slits between the first and second transparent electrodes. Preferably, the electric field is a fringe field that has strong electric field components in a direction substantially parallel and in a direction substantially orthogonal to the substrate. Accordingly, the liquid crystal device in FFS mode can be provided.

Preferably, for example, low-temperature poly-silicon (LTPS) TFTs manufactured on a glass substrate at 600° C. or lower, three-terminal elements represented by poly-silicon (P—Si) TFTs or α-Si TFTS, or two-terminal non-linear elements represented by thin film diodes (TFDS) may be used as the switching elements.

In a comparative example, each unit pixel has subpixels arranged in one row and a plurality of columns, the subpixels have a rectangular shape having a long side and a short side, and the direction in which the long side of each of the slits in the second transparent electrode extends is defined as the direction in which the short side of each of the subpixels extends. To appropriately drive liquid crystal in FFS mode, the slits need to be evenly disposed throughout each of the subpixels. In the comparative example, the slits must be arranged at appropriate intervals in the direction of the long side of each of the subpixels, and hence, the number of slits is increased. In a general liquid crystal device in FFS mode, when liquid crystal is driven, application of a fringe field (electric field E) is changed in the vicinity of one of two ends of each of the slits in the long-side direction, compared with other regions away from the end of the slit. This results in a generation of a domain region where liquid crystal molecules are hardly driven (liquid crystal alignment abnormal region). In the domain region, brightness is reduced, and the domain region seems as a dark region when displayed. Phenomenally, the number of such domain regions is the number of slits, and such domain regions are generated in an alternating zigzag pattern in the adjacent slits. As in the comparative example, the larger the number of slits in each of the subpixels, the larger the number of domain regions that do not contribute to brightness, and hence, the transmittance of the liquid crystal device is greatly reduced.

However, according to the liquid crystal device of the aspect of the invention, each unit pixel includes a plurality of subpixels arranged in a plurality of rows and a plurality of columns, and the direction in which the long side of each of the slits in the second transparent electrode extends is defined to be different from the direction in which the columns extend, which is the direction in which the subpixels are arranged. Preferably in this case, the direction in which the long side of each of the slits extends is defined as the direction in which the rows extend or a direction oriented at a predetermined angle with respect to the direction in which the rows extend.

Accordingly, the slits are evenly disposed throughout the second transparent electrode, and the number of slits is reduced from that in the aforementioned comparative example. In the liquid crystal device according to the aspect of the invention, when liquid crystal is driven, a domain region is generated near one of two ends of each of the slits in the long-side direction. However, since the number of slits in the second transparent electrode is reduced from that in the aforementioned comparative example, the number of domain regions is also reduced. As a result, a reduction in transmittance can be prevented.

Preferably in this case, the liquid crystal device further includes a plurality of first lines extending in the direction in which the columns extend and a plurality of second lines extending in the direction in which the rows extend, the first and second lines being electrically connected to the switching elements. The direction in which the long side of each of the slits extends is defined as the direction in which the second lines extend or a direction oriented at a predetermined angle with respect to the direction in which the second liens extend. The first lines may serve as data lines to which image signals are supplied or gate lines to which scanning signals are supplied, and, accordingly, the second lines may serve as gate lines to which scanning signals are supplied or data lines to which image signals are supplied.

It is preferable that the first transparent electrode be a common electrode connected to a common potential, and the second transparent electrode be a unit subpixel electrode that is disposed for each one of the subpixels and that is electrically connected to a corresponding one of the switching elements via contact holes in the first and second insulating films.

In this case, the first transparent electrode may be a common electrode connected to a common potential, and the second transparent electrode may be a unit subpixel electrode that is disposed for each one of the subpixels and that is electrically connected to a corresponding one of the switching elements via contact holes in the first and second insulating films.

Alternatively, it is preferable that the first transparent electrode be a unit subpixel electrode that is disposed for each one of the subpixels and that is electrically connected to a corresponding one of the switching elements via a contact hole in the first insulating film, and the second transparent electrode be a common electrode connected to a common potential.

In this case, the first transparent electrode may be a unit subpixel electrode that is disposed for each one of the subpixels and that is electrically connected to a corresponding one of the switching elements via a contact hole in the first insulating film, and the second transparent electrode may be a common electrode connected to a common potential.

It is preferable that the liquid crystal device further include a counter substrate facing the substrate with liquid crystal disposed therebetween. A colored layer of an arbitrary single color is disposed on the counter substrate at each of positions corresponding to the subpixels in each of the unit pixels, and the areas of the subpixels are set to be the same.

In this case, the liquid crystal device may have a counter substrate facing the substrate with liquid crystal disposed therebetween. A colored layer of an arbitrary single color may be disposed on the counter substrate at each of positions corresponding to the subpixels in each of the unit pixels. With this structure, the unit pixel having arbitrary four colors is constructed. The areas of the subpixels may be set to be the same.

Alternatively, it is preferable that the liquid crystal device further include a counter substrate facing the substrate with liquid crystal disposed therebetween. A colored layer of an arbitrary single color is disposed on the counter substrate at each of positions corresponding to the subpixels in each of the unit pixels, and, among the plurality of subpixels, the area of at least one of the subpixels is set to be different from the areas of the other subpixels.

In this case, the liquid crystal device may have a counter substrate facing the substrate with liquid crystal disposed therebetween. A colored layer of an arbitrary single color may be disposed on the counter substrate at each of positions corresponding to the subpixels in each of the unit pixels. With this structure, the unit pixel having arbitrary four colors is constructed. Among the plurality of subpixels, the area of at least one of the subpixels may be set to be different from the areas of the other subpixels. Preferably in this case, in the unit pixel, the areas of the subpixels arranged in the same row or the areas of the subpixels arranged in the same column are set to be different.

Accordingly, the white balance can be adjusted by changing, if needed, the areas of the subpixels in the unit pixel, as described above, instead of the subpixels in the unit pixel having the same area.

According to another aspect of the invention, there is provided an electronic apparatus including the above-described liquid crystal display as a display unit.

BRIEF DESCRIPTION OF THE DRAWINGS

The invention will be described with reference to the accompanying drawings, wherein like numbers reference like elements.

FIG. 1 is a plan view schematically showing the structure of a liquid crystal device according to a first embodiment of the invention.

FIGS. 2A and 2B are enlarged plan views showing the pixel structure and the like according to the first embodiment and a second embodiment.

FIG. 3 is a cross-sectional view of main portions including subpixels according to the first embodiment.

FIG. 8B is a cross-sectional view of main portions according to a comparative example.

FIGS. 9A and 9B are enlarged plan views showing the pixel structure and the like according to modifications of the first and second embodiments.

FIGS. 10A and 10B are enlarged plan views showing the pixel structure and the like according to modifications of the first and second embodiments.

DESCRIPTION OF EXEMPLARY EMBODIMENTS

Figure 4:
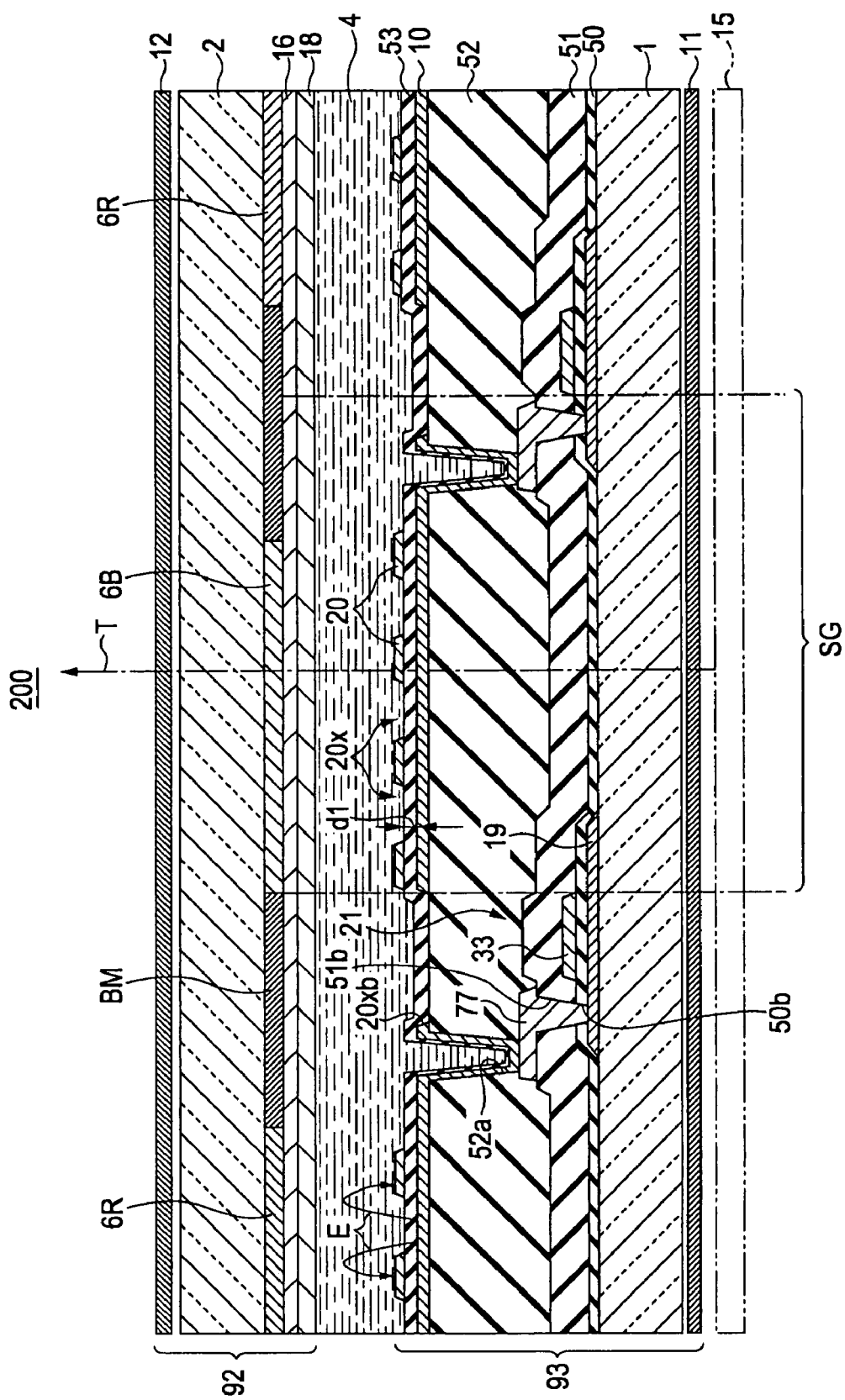
FIG. 4 is a cross-sectional view of main portions including subpixels according to the second embodiment.

Preferred embodiments of the invention will be described below with reference to the drawings. In the following embodiments, the invention is applied to a liquid crystal device. In the specification, the term "on the inner surface" means "on the inner surface" facing a liquid crystal layer 4. Thus, for example, the phrase "on the inner surface of the element substrate" means "on the inner surface of the element substrate facing the liquid crystal layer 4".

First Embodiment

Structure of Liquid Crystal Device

With reference to FIG. 1 and the like, the structure of a liquid crystal device 100 and the like according to a first embodiment of the invention will be described.

FIG. 1 is a plan view schematically showing the schematic structure of the liquid crystal device 100 according to the first embodiment of the invention. In FIG. 1, a color filter substrate 92 is placed at the front side when viewed in FIG. 1(near the observer of FIG. 1), and an element substrate 91 is placed at the rear side when viewed in FIG. 1. The vertical direction in FIG. 1 (column direction, which is the direction in which columns extend) is defined as the Y-direction, and the horizontal direction in FIG. 1 (row direction, which is the direction in which rows extend) is defined as the X-direction. In FIG. 1, regions represented by red (R), green (G), blue (B), and an arbitrary color (other, which may be abbreviated as "O") indicate subpixel regions SG, and a pixel arrangement having the subpixels SG for R, G, B, and O arranged in a two-by-two (two rows and two columns) pattern indicates a display pixel region AG. The subpixel regions SG are substantially square and have the same area. In the following description, one display region existing in one subpixel region SG may be referred to as a "subpixel", and a display region corresponding to one pixel region AG may be referred to as a "unit pixel".

The liquid crystal device 100 has the element substrate 91 and the color filter substrate 92 facing the element substrate 91. The element substrate 91 and the color filter substrate 92 are bonded to each other via a frame-shaped sealing member 5. Liquid crystal is sealed in regions defined by the sealing member 5 to form the liquid crystal layer 4.

The liquid crystal device 100 is a liquid crystal device for displaying four colors R, G, B, and O utilizing active-matrix driving using, as switching elements, LTPS TFTs having a double-gate structure (hereinafter referred to as "LTPS TFTs 21"), which are manufactured on a first substrate 1 (described later) at 600° C. or lower. The liquid crystal device 100 is a liquid crystal device in so-called FFS mode where the alignment of liquid crystal molecules is controlled by generating, on the element substrate 91 on which various electrodes including pixel electrodes are disposed, a fringe field (electric field E) in a direction substantially parallel and in a direction substantially orthogonal to the element substrate 91 (near the observer of FIG. 1). Thus, the liquid crystal device 100 can achieve a wide viewing angle and the like. The liquid crystal device 100 is a transmissive liquid crystal device that only performs a transmissive display operation.

The planar structure of the element substrate 91 will be described below.

A plurality of source lines 32, a plurality of gate lines 33, the plurality of LTPS TFTs 21, a plurality of pixel electrodes 10, a common electrode 20, a signal-line drive circuit 40, a scanning-line drive circuit 41, external connection lines 35, and a surface-mounted component 42 such as a flexible printed circuit (FPC) are formed or mounted as main components on the inner surface of the element substrate 91.

As shown in FIG. 1, the element substrate 91 has an extended region 36 extending outward from two adjacent sides of the color filter substrate 92. The signal-line drive circuit 40 is mounted on the extended region 36 positioned in the Y direction outside one side of the color filter substrate 92. The scanning-line drive circuit 41 is mounted on the extended region 36 positioned in the X direction outside the other side of the color filter substrate 92. Input terminals (not shown) of the signal-line drive circuit 40 and the scanning-line drive circuit 41 are electrically connected to one end of the external connection lines 35. The other end of each of the external connection lines 35 is connected to the surface-mounted component 42. In FIG. 1, the connection between the scanning-line drive circuit 41 and the surface-mounted component 42 via the external connection lines 35 is omitted.

The source lines 32 are formed so as to extend in the Y direction at appropriate intervals in the X direction. One end of each of the source lines 32 is electrically connected to an output terminal (not shown) of the signal-line drive circuit 40.

The gate lines 33 have a three-layer structure including, for example, titan (Ti), aluminum (Al), and titan (Ti). The gate lines 33 are formed so as to extend in the X direction at appropriate intervals in the Y direction in an effective display region V. One end of each of the gate lines 33 is electrically connected to an output terminal (not shown) of the scanning-line drive circuit 41.

The LTPS TFTs 21 are disposed near the corresponding intersections of the source lines 32 and the gate lines 33. The LTPS TFTs 21 are electrically connected to the source lines 32, the gate lines 33, the pixel electrodes 10, and the like.

The pixel electrodes 10 are made of a transparent conductive material, such as ITO, and are disposed in the corresponding subpixel regions SG.

The common electrode 20 is made of the same material as that of the pixel electrodes 10, has substantially the same area as the effective pixel region V (region enclosed by bold broken lines), and disposed substantially as a solid electrode below the pixel electrodes 10 with a third insulating film (dielectric film) 53 (shown in FIG. 3) disposed therebetween. The common electrode 20 is electrically connected to, for example, a common potential terminal (COM terminal) in the signal-line drive circuit 40 via a common line 27 made of the same material as that of the common electrode 20.

The effective display region V (region enclosed by two-dot chain lines) is a region where a plurality of pixel regions AG are arranged in a matrix in the X and Y directions. An image, such as a character, a numeral, or a figure is displayed in the effective display region V. The region outside the effective display region V is a frame region 38 that does not contribute to a display operation. An alignment film (not shown) is disposed on the inner surface of each of the pixel electrodes 10 or the like. The alignment film has been rubbed in a predetermined direction R (see FIG. 2).

Next, the planar structure of the color filter substrate 92 will be described below.

The color filter substrate 92 has, as is clear with reference to FIG. 3, a light-shielding layer (generally referred to as a "black matrix" and hereinafter abbreviated as "BM"), colored layers 6R, 6G, 6B, and 60 of the four colors R, G, B, and O, an overcoat layer 16, and an alignment film 18. In the following description, the colored layers may be collectively referred to as the "colored layer 61", and, when the colors of the colored layers are distinguished, they are referred to as "the colored layer 6R", etc. BMs are disposed at positions defining the subpixel regions SG or the like.

In the liquid crystal device 100 with the structure described above, on the basis of a signal, power, and the like from the surface-mounted component 42 connected to an electronic apparatus or the like, the gate lines 33 are sequentially and exclusively selected one by one in the order of $G_1, G_2, \ldots, G_{m-1}$, and $G_m$ (m is a natural number) by the scanning-line drive circuit 41. A selection-voltage gate signal is supplied to the selected gate line 33, whereas a non-selection-voltage gate signal is supplied to the unselected gate lines 33. The signal-line drive circuit 40 supplies source signals in accordance with the contents to be displayed to the pixel electrodes 10 located at positions corresponding to the selected gate line 33 via the source lines 32, namely, $S_1, S_2, \ldots, S_{n-1}$, and $S_n$ (n is a natural number) and the LTPS TFTs 21. As a result, the display state of the liquid crystal layer 4 is switched to a non-display state or an intermediate display state, and the alignment state of the liquid crystal molecules in the liquid crystal layer 4 is controlled. Accordingly, a desired image can be displayed in the effective display region V.

Pixel Structure

With reference to FIGS. 2A and 3, the pixel structure and the like in the liquid crystal device 100 according to the first embodiment of the invention will be described.

FIG. 2A shows the planar structure of one pixel on the element substrate 91 according to the first embodiment. In FIG. 2A, the minimum components necessary for describing the element substrate 91 are shown. FIG. 3 is a cross-sectional view, taken along the line III-III of FIG. 2A, of one subpixel cut at the position across the LTPS TFT 21.

The pixel structure and the like on the element substrate 91 according to the first embodiment will be described.

The element substrate 91 has the effective display region V (see FIG. 1) in which unit pixels, each including four subpixels arranged in a two-by-two pattern, are arranged in a matrix. In each of the unit pixels, the subpixels correspond to electrode portions where the pixel electrodes 10 are superimposed on the common electrode 20 in plane. The subpixels are set to have substantially the same area.

On the inner surface of the first substrate 1, which is a glass substrate, P—Si layers 19 having a substantially U-shaped planar form so as to double-cross the corresponding gate lines 33 are disposed at the intersections of the source lines 32 and the gate lines 33. A gate insulating film 50 made of, for example, silicon dioxide ($SiO_2$) or the like, is formed on the inner surfaces of the P—Si layers 19 and the first substrate 1.

The gate insulating film 50 has a first contact hole 50a, which is positioned at one end of the corresponding P—Si layer 19 so as to be superimposed on part of the corresponding source line 32 in plane, and a second contact hole 50b, which is positioned at the other end of the corresponding P—Si layer 19. The gate lines 33 are disposed on the inner surface of the gate insulating film 50. As shown in FIG. 2A, the gate lines 33 are formed so as to extend in the X direction at predetermined intervals in the Y direction. The gate lines 33 are superimposed on part of the corresponding P—Si layers 19 in plane. The intervals of the subpixels adjacent in the direction in which the source lines 32 extend (described later) are greater than the intervals of the subpixels adjacent in the direction in which the gate lines 33 extend.

A transparent first insulating film 51 made of, for example, silicon dioxide ($SiO_2$) or the like, is disposed on the inner surfaces of the gate lines 33 and the gate insulating film 50. The first insulating film 51 has a first contact hole 51a at a position corresponding to the first contact hole 50a, and a second contact hole 51b at a position corresponding to the second contact hole 50b. The source lines 32 and relay electrodes 77 are disposed on the inner surface of the first insulating film 51.

As shown in FIG. 2A, the source lines 32 are formed so as to extend in the Y direction at predetermined intervals in the X direction. Part of each of the source lines 32 is superimposed on part of one end of the corresponding P—Si layer 19 in plane. Part of each of the source lines 32 is pulled into the first contact holes 50a and 51a, and the source line 32 is electrically connected to one end of the corresponding P—Si layer 19. Each of the relay electrodes 77 is superimposed on part of the other end of the corresponding P—Si layer 19 in plane. Part of each of the relay electrodes 77 is pulled into the second contact holes 50b and 51b, and the relay electrode 77 is electrically connected to the other end of the corresponding P—Si layer 19. Accordingly, each source line 32 is electrically connected to the corresponding relay electrodes 77 via the corresponding P—Si layers 19. In this way, the LTPS TFTs 21 having a double-gate structure are disposed at the intersections of the source lines 32 and the gate lines 33, which are positions corresponding to the P—Si layers 19.

A second insulating film 52 made of, for example, a transparent acrylic resin is disposed on the inner surfaces of the source lines 32, the relay electrodes 77, and the first insulating film 51. The inner surface of the second insulating film 52 is planar, and the second insulating film 52 constitutes a planar film. The second insulating film 52 has a contact hole 52a, which is positioned at one end of the corresponding relay electrode 77 and which is in the vicinity of the second contact holes 50*b* and 51*b*. According to the first embodiment of the invention, an additional insulating film such as a silicon-nitride (SiNx) film may be disposed between the first insulating film 51 and the second insulating film 52.

The common electrode 20 electrically connected to the COM terminal is disposed on substantially the entire inner surface of the second insulating film 52 (see also FIG. 1). The common electrode 20 is made of a transparent conductive material, such as ITO, and has an opening 20*a* at a position corresponding to the corresponding contact hole 52*a*. A third insulating film 53 made of, for example, silicon dioxide (SiO$_2$) or silicon nitride (SiNx) is disposed on the inner surface of part of the second insulating film 52 positioned in the contact holes 52 and on the inner surface of the common electrode 20. The third insulating film 53 has a contact hole 53*a* at a position corresponding to the corresponding contact hole 52*a* of the second insulating film 52. Since the third insulating film 53 is disposed between the common electrode 20 and the pixel electrodes 10 described later, the third insulating film 53 functions as a dielectric film forming an auxiliary capacitance. To ensure a sufficient auxiliary capacitance, it is preferable that the thickness d1 of the third insulating film 53 be as thin as possible.

To achieve the aforementioned structure, the thickness d1 of the third insulating film 53 is preferably set so that the auxiliary capacitance formed thereby is about 100-600 fF, and more preferably about 200-800 fF. To achieve a resolution of 200 PPi or greater, it is preferable that the thickness d1 of the third insulating film 53 be set to about 50-400 nm. To achieve a resolution less than 200 PPi, it is preferable that the thickness d1 of the third insulating film 53 be set to about 200-1000 nm.

The pixel electrodes 10 made of a transparent conductive material, such as ITO, are disposed in the corresponding subpixel regions SG on the inner surface of the third insulating film 53. The pixel electrodes 10 are substantially square in accordance with the shape of the subpixel regions SG. In each of the unit pixels, the pixel electrodes. 10 corresponding to the subpixels are set to have the same area. The pixel electrodes 10 are pulled into the contact holes 52*a* and 53*a* and are electrically connected to the corresponding relay electrodes 77 via the contact holes 52*a* and 53*a*. Thus, source signals (video signals) from the source lines 32 are supplied via the LTPS TFTs 21 and the relay electrodes 77 to the pixel electrodes 10. The pixel electrodes 10 face the common electrode 20 via the third insulating film 53 and are superimposed on the common electrode 20 via the third insulating film 53 in plane. The pixel electrodes 10 each have a plurality of slits 10*x* for generating a fringe field (electric field E) between the pixel electrode 10 and the common electrode 20. The slits 10*x* are horizontal thin stripes, and the direction in which a long side 10*xa* of each of the slits 10*x* extends is defined to be different from the column direction, which is the direction in which the subpixels are arranged, and from the direction in which the source lines 32 extend. In this example, the direction in which the long side 10*xa* of each of the slits 10*x* extends is defined as a direction oriented at a predetermined angle with respect to the row direction, which is the direction in which the subpixels are arranged, and the direction in which the gate lines 33 extend. Note that, according to the first embodiment of the invention, the direction in which the long side 10*xa* of each of the slits 10*x* extends may be defined as the row direction, which is the direction in which the subpixels are arranged, and the direction in which the gate lines 33 extend. In this example, the short side (reference numeral thereof is omitted) of each of the slits 10*x*, which is continuous from the long side 10*xa* of the slit 10*x*, has a curved shape. However, the shape of the short side is not limited thereto, and, for example, the short side may be a straight line.

An alignment film (not shown) is disposed on the inner surfaces of part of the third insulating film 53 and the pixel electrodes 10. As shown in FIG. 2A, the alignment film has been rubbed in the direction in which the gate lines 33 extend (hereinafter referred to as the "rubbing direction R"). Thus, in the initial alignment state, liquid crystal molecules 4*a* are aligned such that the major axis thereof is along the rubbing direction R. A polarization plate 11 is disposed below the first substrate 1, and a backlight 15 serving as a lighting device is disposed below the polarization plate 11. The element substrate 91 with the pixel structure according to the first embodiment is structured in this manner.

The structure of the color filter substrate 92 corresponding to the above-described pixel structure will be described below.

In one pixel region AG on the inner surface of a second substrate 2, which is a glass substrate, the colored layer 6 of an arbitrary color, e.g., a corresponding one of the red (R) colored layer 6R, the green (G) colored layer 6G, the blue (B) colored layer 6B, and the arbitrary-color (O) colored layer 60, is provided in each subpixel region SG. According to the first embodiment of the invention, there is no limitation on the order of arranging the red (R), green (G), blue (B), and arbitrary-color (O) colored layers 6 for the two-by-two subpixels, and the order of arranging the R, G, B, and O colored layers 6 is arbitrary. BMS are disposed at positions defining the subpixel regions SG and positions corresponding to the LTPS TFTs 21 on the inner surface of the second substrate 2. Thus, the LTPS TFTs 21, the source lines 32, the gate lines 33, and the like are superimposed on the BMS in plane. The overcoat layer 16 is disposed on the inner surfaces of the BMS and the colored layers 6. The overcoat layer 16 has a function of protecting the colored layers 6 and the like from corrosion and contamination by chemical substances used in manufacturing the liquid crystal device 100. The alignment film 18, which has been rubbed in the predetermined direction, is disposed on the inner surface of the overcoat layer 16. The color filter substrate 92 according to the first embodiment is structured in the above-described manner.

When the liquid crystal device 100 with the structure described above is driven, the liquid crystal molecules (not shown) in the initial alignment state along the rubbing direction R are rotated clockwise or counterclockwise by a fringe field (electric field E) induced in the direction in which the source lines 32 extend and are realigned in the direction in which the source lines 32 extend. In the cross section shown in FIG. 3, the fringe field (electric field E) has strong electric field components in a direction substantially parallel to the element substrate 91 (horizontally across the page) and in a direction substantially orthogonal to the element substrate 91 (toward the color filter substrate). The fringe field (electric field E) is generated between the pixel electrodes 10 and the common electrode 20 through the plural slits 10*x* and the third insulating film 53. Accordingly, the alignment of the liquid crystal molecules is controlled to perform a transmissive display operation. In the transmissive display operation, illumination light emitted from the backlight 15 proceeds along a path T shown in FIG. 3 through the common electrode 20, the pixel electrodes 10, the R, G, B, and O colored layers 6, and the like, and reaches the observer. In this case, the illumination light passing through the colored layers 6 and the like exhibits a predetermined hue and brightness. In this way, a desired color image is displayed and observed by the observer.

Structure of Electrical Equivalent Circuit

Figure 5:
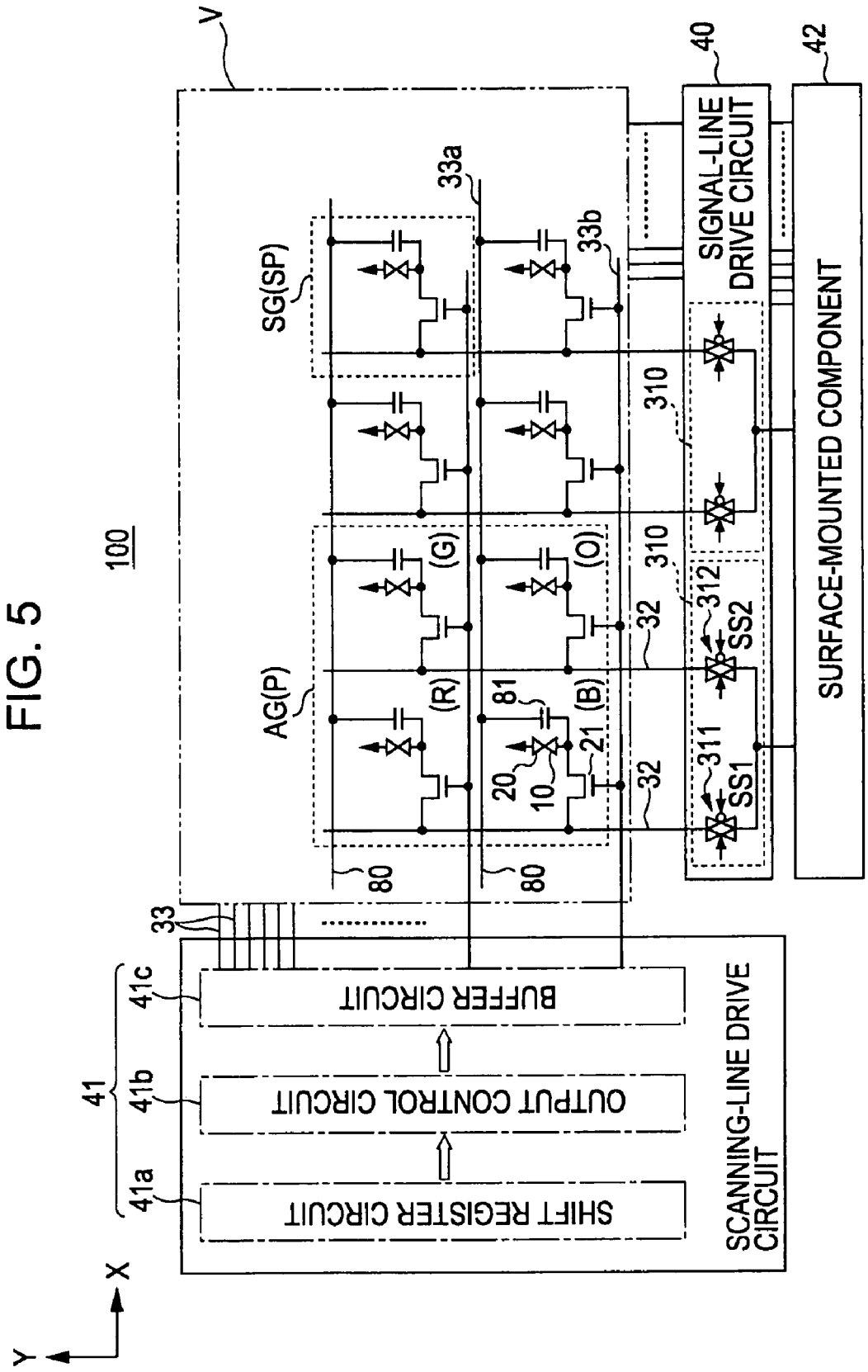
FIG. 5 is a block diagram of an electrical equivalent circuit of the liquid crystal device according to the first embodiment.

With reference to FIG. 5 and the like, the structure of an electrical equivalent circuit of the liquid crystal device 100 according to the first embodiment will be described. FIG. 5 is a block diagram of the electrical equivalent circuit of the liquid crystal device 100. Although the scanning-line drive circuit 41 and the surface-mounted component 42 are connected to each other via the external connection lines 35, the connection is not shown in FIG. 5 for convenience.

The liquid crystal device 100 has the effective display region V in which unit pixels, each of which is disposed in one pixel region AG (hereinafter referred to as the "unit pixels P"), are arranged in a row-column (X-Y) matrix; the signal-line drive circuit 40 and the scanning-line drive circuit 41, which are disposed outside the effective display region V and which drive the subpixels (hereinafter referred to as the "subpixels SP") disposed in the associated subpixel regions SG; and the surface-mounted component 42, which is electrically connected to the signal-line drive circuit 40 and the scanning-line drive circuit 41 and which serves as an interface between the liquid crystal device 100 and an electronic apparatus.

The liquid crystal device 100 has the gate lines 33, a plurality of common lines 80, and the source lines 32. The gate lines 33 and the common lines 80 are alternately arranged at predetermined intervals. The source lines 32 are arranged at predetermined intervals and intersect the gate lines 33 and the common lines 80.

Each unit pixel P includes four subpixels SP arranged in a two-by-two pattern. In other words, the arrangement of the four subpixels SP in the unit pixel P is such that two columns are arranged in the direction in which the source lines 32 extend (Y direction) and two rows are arranged in the direction in which the gate lines 33 extend (X direction). The subpixels SP are arranged at positions corresponding to the intersections of the gate lines 33/common lines 80 and the source lines 32. In the first embodiment of the invention, as has been described above, the third insulating film 53 serving as a dielectric film, which is disposed between the pixel electrodes 10 and the common electrode 20, forms an auxiliary capacitance. It is thus not necessary to provide the common lines 80 and storage capacitors 81 described later.

At least the LTPS TFT 21, the pixel electrode 10, the common electrode 20 facing the pixel electrode 10 via the third insulating film 53 (not shown), and the storage capacitor 81 electrically connected to the pixel electrode 10 and the common line 80 are disposed in each of the subpixel regions SG.

The gate line 33 is connected to a gate electrode of the LTPS TFT 21, the source line 32 is connected to a source electrode of the LTPS TFT 21, and the pixel electrode 10 and the storage capacitor 81 are connected to a drain electrode of the LTPS TFT 21. The liquid crystal layer 4 is held between the pixel electrode 10 and the common electrode 20. Thus, when a selection voltage is applied from the gate line 33 to the LTPS TFT 21, the source line 32 becomes electrically connected to the pixel electrode 10 and the storage capacitor 81.

The scanning-line drive circuit 41 line-sequentially supplies a selection voltage for establishing an electrical connection with the LTPS TFTs 21 to the gate lines 33. For example, when a selection voltage is supplied to a certain gate line 33, an electrical connection is established with all the LTPS TFTs 21 connected to the gate line 33, thereby selecting all the subpixels corresponding to the gate line 33. Specifically, the scanning-line drive circuit 41 has a shift register circuit 41a, an output control circuit 41b, and a buffer circuit 41c. Power and various signals are supplied from an external circuit of an electronic apparatus (not shown) via the surface-mounted component 42 to the scanning-line drive circuit 41. The shift register circuit 41a is a sequential-transfer shift register. When various signals such as a start signal VSP (start signal of one frame), a clock signal VCK, and a direction signal VDIR (signal specifying a gate-line scanning direction) are supplied from the external circuit of the electronic apparatus to the shift register circuit 41a, the shift register circuit 41a outputs these various signals to the output control circuit 41b. The output control circuit 41b is a circuit that controls the operation of the scanning-line drive circuit 41. When a drive signal VENB supplied from a power circuit in the external circuit of the electronic apparatus is at a low level, the output control circuit 41b outputs a control signal for selecting a certain gate line 33 to the buffer circuit 41c, and outputs the various signals such as the start signal VSP, the clock signal VCK, and the direction signal VDIR output from the shift register circuit 41a to the buffer circuit 41c. The buffer circuit 41c is a waveform shaping circuit that shapes the waveform of various signals output from the output control circuit 41b. In the first embodiment of the invention, a level shifter circuit that amplifies the level of various signals output from the output control circuit 41b may be disposed between the output control circuit 41b and the buffer circuit 41c. The scanning-line drive circuit 41 with the structure described above sequentially scans the gate lines 33 having the address numbers $G_1, G_2, \ldots, G_{m-1}$, and $G_m$ (see also FIG. 1) within one vertical scanning period (1V period) and sequentially scans two gate lines 33 within one horizontal scanning period (1H period), thereby driving the unit pixels P.

The signal-line drive circuit 40 supplies image signals to the source lines 32 to sequentially write image information into the pixel electrodes 10 in the subpixel regions SG via the turned-ON LTPS TFTs 21. Specifically, the signal-line drive circuit 40 has demultiplexer unit circuits 310 serving as demultiplexers provided corresponding to columns of unit pixels P. Each of the demultiplexer unit circuits 310 has a pair of transfer gates 311 and 312. The demultiplexer unit circuit 310 has a function of distributing a time-division signal supplied from the external circuit of the electronic apparatus (not shown) between the source lines 32 associated with the corresponding unit pixels P by electrically opening/closing the transfer gates 311 and 312. In the first embodiment of the invention, it is not necessary to provide the demultiplexer unit circuits 310 in the signal-line drive circuit 40. When the demultiplexer unit circuits 310 are not provided in the signal-line drive circuit 40, the source lines 32 are directly electrically connected to the signal-line drive circuit 40.

The operation of the liquid crystal device 100 with the above-described arrangement will be described below.

That is, all the subpixels SP connected to a certain gate line 33 are selected by line-sequentially supplying a selection voltage from the scanning-line drive circuit 41 to the gate line 33. In synchronization with the selection of the subpixels SP, the signal-line drive circuit 40 supplies image signals to the source lines 32. With this operation, the image signals are supplied to all the subpixels SP selected by the scanning-line drive circuit 41 and the signal-line drive circuit 40 from the source lines 32 via the LTPS TFTs 21, thereby writing image information into the pixel electrodes 10.

When the image information is written into the pixel electrodes 10 in the subpixel regions SG, a drive voltage is applied to the liquid crystal layer 4 due to the potential difference between the pixel electrodes 10 and the common electrode 20. By changing the voltage level of the image signals, the alignment and order of the liquid crystal are changed so that grayscale display is implemented by light modulation of the subpixels SP.

Because of the storage capacitors 81, the drive voltage applied to the liquid crystal is held over a period longer than the period for which the image information is written by three orders of magnitude.

Figure 6:
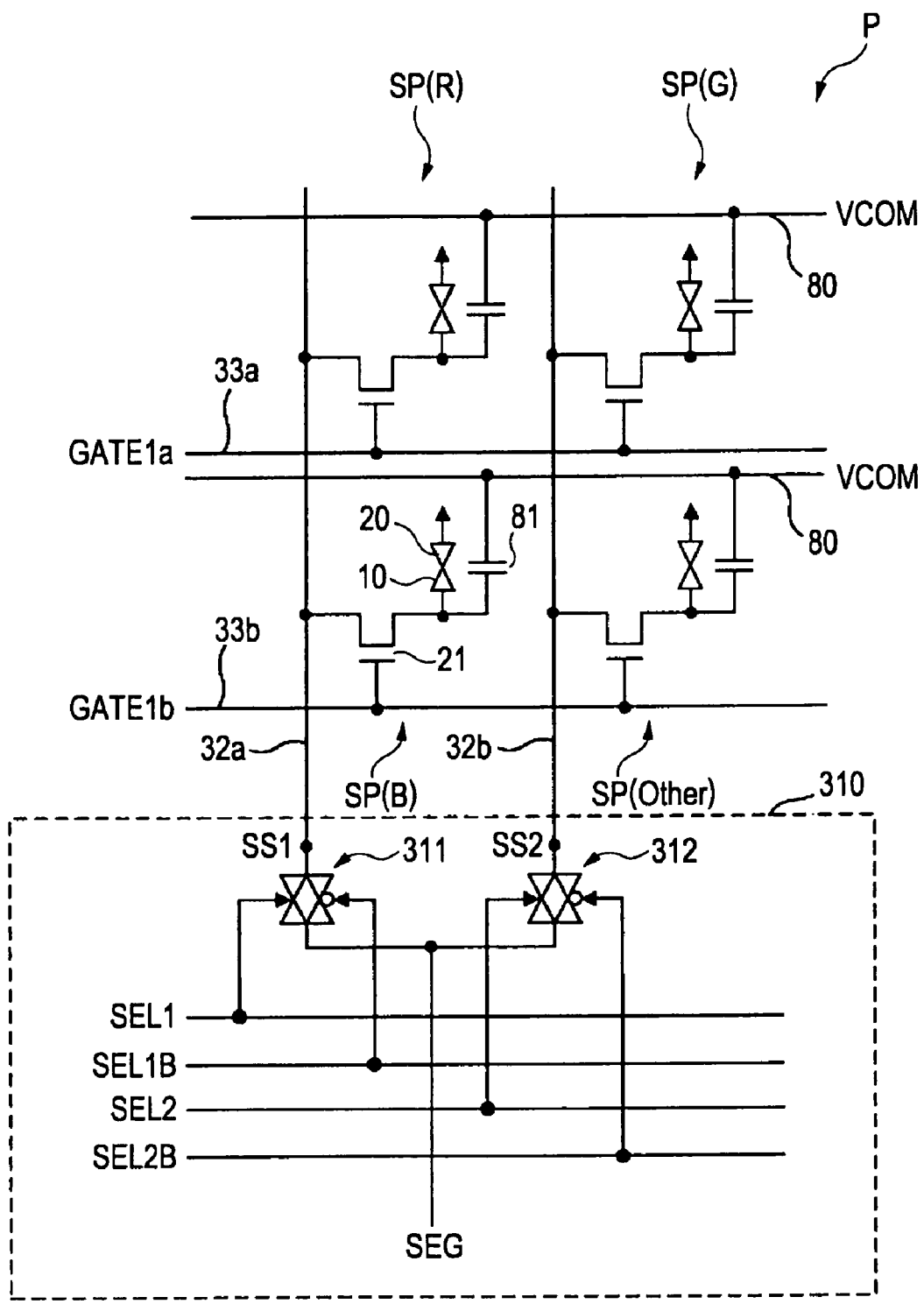
FIG. 6 is a circuit diagram showing the structure of a demultiplexer unit circuit disposed in a signal-line drive circuit.

FIG. 6 is a circuit diagram of the electrical structure of an arbitrary unit pixel P in the effective display region V and the demultiplexer unit circuit 310 corresponding to the arbitrary unit pixel P.

For convenience of the description, the upper gate line 33 is referred to as the "gate line 33a", and the lower gate line 33 is referred to as the "gate line 33b" in FIG. 6. A scanning signal GATE1a is supplied to the gate line 33a, and a scanning signal GATE1b is supplied to the gate line 33b. For convenience of the description, the left source line 32 is referred to as the "source line 32a", and the right source line 32 is referred to as the "source line 32b" in FIG. 6. A drive signal VCOM is supplied to the common lines 80 and the common electrode 20.

The demultiplexer unit circuit 310 is a one-input two-output (1:2) demultiplexer. The demultiplexer unit circuit 310 has two output terminals SS1 and SS2 for one input terminal SEG. By connecting a selected one of the two output terminals SS1 and SS2 to the input terminal SEG, the demultiplexer unit circuit 310 distributes an image signal supplied as a time-division signal between the source lines 32a and 32b.

The demultiplexer unit circuit 310 has the first transfer gate 311 and the second transfer gate 312 including, for example, complementary metal-oxide semiconductor (CMOS) devices, which are complementary transistors. Specifically, first terminals of the first and second transfer gates 311 and 312 are connected to the input terminal SEG, and second terminals thereof are connected to the output terminals SS1 and SS2, respectively.

The output terminal SS1 is connected to the source line 32a connected to the red (R) and blue (B) subpixels SP. In contrast, the output terminal SS2 is connected to the source line 32b connected to the green (G) and the arbitrary-color (O) subpixels SP.

Selection signals SEL1 and SEL1B are input to control terminals of the first transfer gate 311. The selection signal SEL1B is an inversion of the selection signal SEL1. When the selection signals SEL1 and SEL1B are activated, the first transfer gate 311 is turned ON and supplies an image signal input from the input terminal SEG to the source line 32a.

Selection signals SEL2 and SEL2B are input to control terminals of the second transfer gate 312. The selection signal SEL2B is an inversion of the selection signal SEL2. When the selection signals SEL2 and SEL2B are activated, the second transfer gate 312 is turned ON and supplies an image signal input from the input terminal SEG to the source line 32b.

A multiplexed signal including image information of red (R), green (G), blue (B) and arbitrary color (O) is input to the input terminal SEG.

The operation of the above-described demultiplexer unit circuit 310 will be described below.

An image signal is supplied to the input terminal SEG, and the selection signals SEL1 and SEL1B or the selection signals SEL2 and SEL2B are activated. With this operation, the source line 32a connected to the red (R) and blue (B) subpixels or the source line 32b connected to the green (G) and arbitrary color (O) subpixels is selected, and the image signal is supplied to the selected source line 32.

Figure 7:
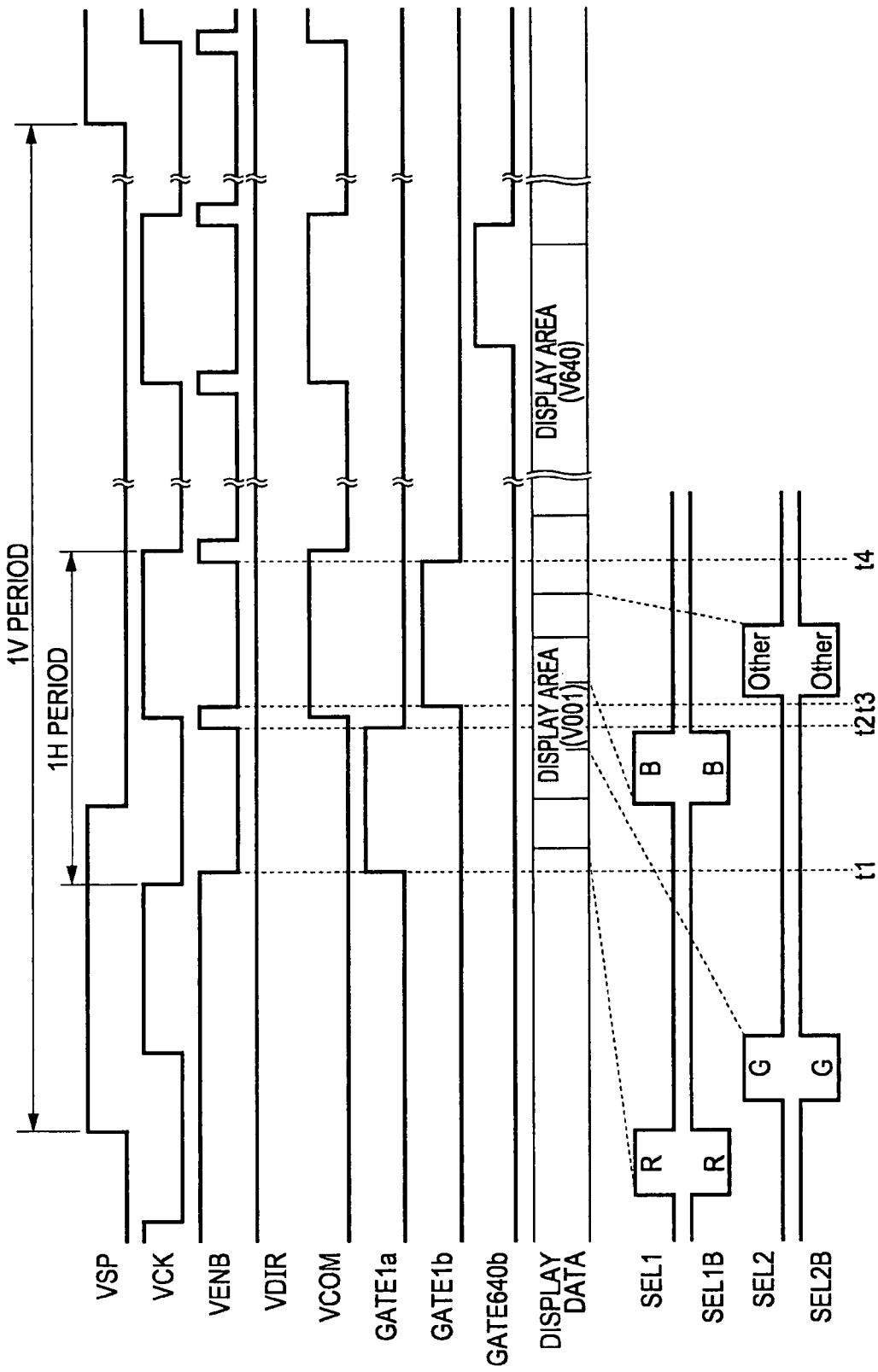
FIG. 7 is a timing chart according a method of driving the liquid crystal device according to the first embodiment.

With reference to FIG. 7, a method of driving the liquid crystal device 100 will be described. FIG. 7 is a timing chart according a method of driving the liquid crystal device 100.

As has been described above, VSP is a start signal, and VCK is a clock signal. The start signal VSP and the clock signal VCK are supplied via the scanning-line drive circuit 41 to the liquid crystal device 100. VENB is a drive signal. When the drive signal VENB is at a low level, the scanning-line drive circuit 41 can select scanning signals GATE1a, 1b, 2a, 2b, ..., 640a and 640b (e.g., in the case of 1280 gate lines 33) supplied to the gate lines 33.

VDIR is a signal specifying the scanning direction. The direction signal VDIR is always at a high level in the first embodiment, and a scanning operation is performed from left to right in FIG. 5.

VCOM is a drive signal supplied to the common electrode 20 and the common lines 80, as has been described above. In the first embodiment, a line-inversion drive system for inverting the potential of the common electrode 20 every line is adopted. VCOM is inverted every line.

GATEs are scanning signals supplied to the gate lines 33, as has been described above. In the first embodiment, the number of gate lines 33 is, for example, 1280. Referring to FIG. 6, GATE1a is a scanning signal supplied to the top gate line 33a in the effective display region V; GATE1b is a scanning signal supplied to the next top gate line 33b; and GATE640b is a scanning signal supplied to the bottom gate line 33b in the effective display region V.

DISPLAY DATA signal is a time-division image signal supplied to the signal-line drive circuit 40.

In the 1H period, VCOM and VENB are at a low level. From time t1 to time t2, GATE1a is at a high level, thereby selecting the red (R) and green (G) subpixels SP corresponding to the top gate line 33a in the unit pixel P. In synchronization with the selection of the subpixels SP, red (R) and green (G) image information V001 serving as DATA is continuously supplied to the demultiplexer unit circuit 310. During the supply of the red (R) image information V001, the selection signals SEL1 and SEL1B are active, and the selection signals SEL2 and SEL2B are inactive. During the supply of the green (G) image information V001, the selection signals SEL1 and SEL1B are inactive, and the selection signals SEL2 and SEL2B are active.

With this operation, the red (R) image information V001 is supplied via the source line 32a to the red (R) subpixel SP corresponding to the top gate line 33a, and the green (G), image information V001 is supplied via the source line 32b to the green (G) subpixel SP corresponding to the top gate line 33a.

Only from time t2 to time t3, VENB is at a high level, and VCOM is inverted and reaches a high level. At time t3, VENB falls from a high level to a low level. In synchronization with this change, GATE1b is at a high level from time t3 to time t4, thereby selecting the blue (B) and arbitrary color (O) subpixels SP corresponding to the next top gate line 33b in the effective display region V. In synchronization with the selection of the subpixels SP, blue (B) and arbitrary color (O) image information V001 serving as DATA is continuously supplied to the demultiplexer unit circuit 310. During the supply of the blue (B) image information V001, the selection signals SEL1 and SEL1B are active, and the selection signals SEL2 and SEL2B are inactive. During the supply of the arbitrary color (O) image information V001, the selection signals SEL1 and SEL1B are inactive, and the selection signals SEL2 and SEL2B are active.

With this operation, the blue (B) image information V001 is supplied via the source line 32a to the blue (B) subpixel SP corresponding to the next top gate line 33b, and the arbitrary color (O) image information V001 is supplied via the source line 32b to the arbitrary color (O) subpixel SP corresponding to the next top gate line 33b.

The above-described drive control is performed in the 1V period until the scanning signals GATE 640*a* and 640*b* corresponding to image information V640 are at a high level.

As has been described above, the liquid crystal device 100 adopts a driving method in which two subpixels SP positioned in the same row are sequentially scanned (two scanning operations) in the 1H period, thereby supplying image signals to the subpixels SP via the corresponding source lines 32.

Next, an advantage of the liquid crystal device 100 according to the first embodiment will be described in comparison with a comparative example.

Figure 8A:
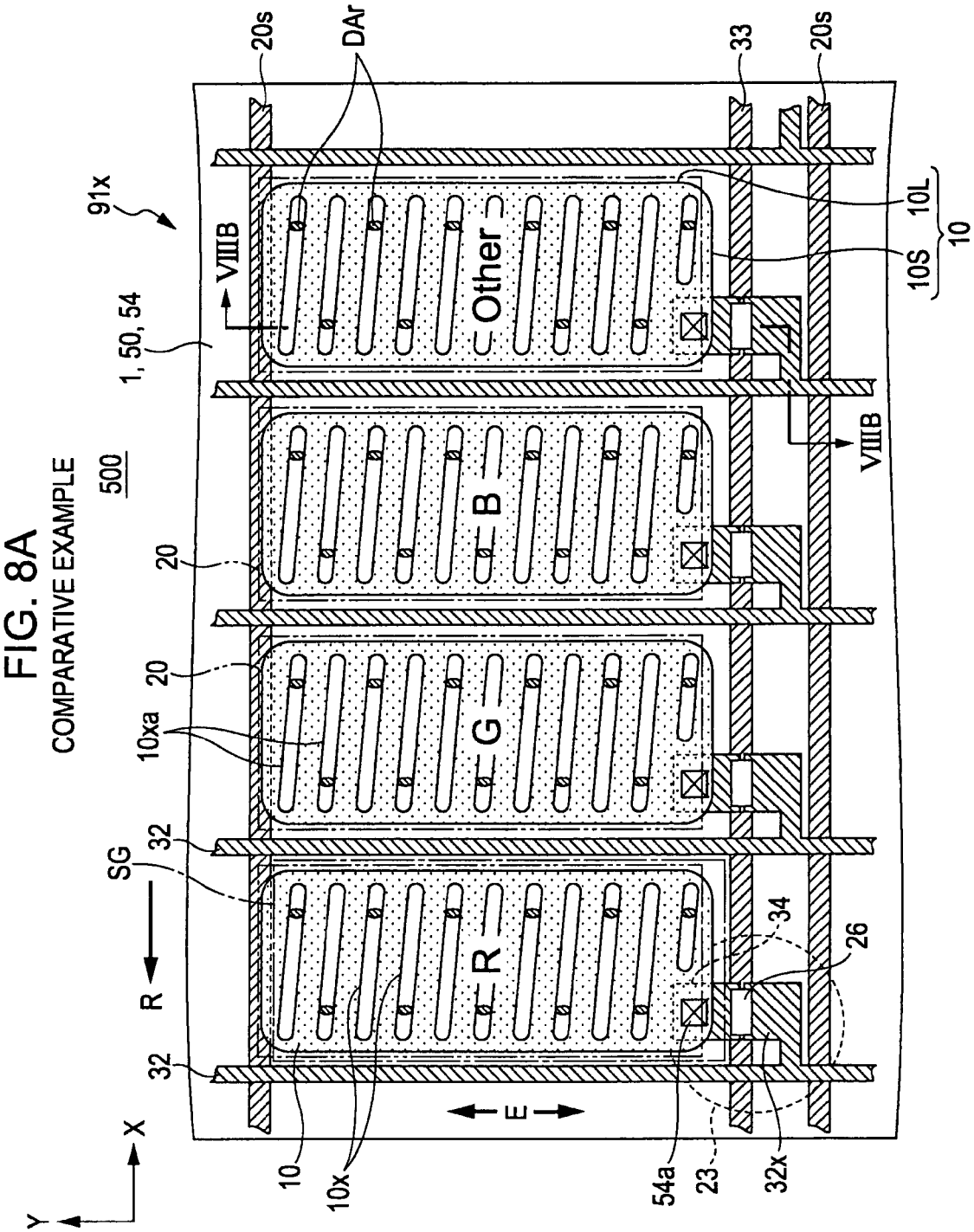
FIG. 8A is an enlarged plan view of the pixel structure.

With reference to FIGS. 8A and 8B, the structure of an element substrate 91*x* of a liquid crystal device 500 in FFS mode and its problems according to a comparative example will be described. Thereafter, an advantage of the first embodiment in comparison with the comparative example will be described. In the comparative example, components common to those in the first embodiment are denoted by the same reference numerals, and descriptions thereof are briefly given or omitted.

FIG. 8A corresponds to FIG. 2A and shows the planar structure of one pixel on the element substrate 91*x* according to the comparative example. FIG. 8B shows a cross-sectional structure, taken along the line VIIIB-VIIIB of FIG. 8A, of one subpixel on the element substrate 91*x*. Subpixel regions SG in the comparative example differ from those in the first embodiment in that the subpixel regions SG in the comparative example are vertically long regions, that is, they each have a long side in the column direction, which is the direction in which the subpixels are arranged, and a short side in the row direction. The direction of the long side of each subpixel region SG is defined as the direction in which the source lines 32 extend, and the direction of the short side of each subpixel region SG is defined as the direction in which the gate lines 33 extend.

The liquid crystal device 500 according to the comparative example has the element substrate 91*x* having α-Si TFTs 23 serving as switching elements, a color filter substrate 92 (not shown), and the liquid crystal layer 4 sealed in a space between the element substrate 91*x* and the color filter substrate 92.

The structure of the element substrate 91*x* will be described below.

In the comparative example, one unit pixel includes one-by-four (one row and four columns) subpixels including four colors, namely, red (R), green (G), blue (B), and another color (O). The area of one pixel region AG according to the comparative example is defined to be the same as that in the first embodiment.

On the first substrate 1, common electrodes 20 (regions enclosed by two-dot chain lines) made of ITO or the like are disposed in the corresponding subpixel regions SG. The common electrodes 20 have a vertically long rectangle shape (vertical stripes), that is, the common electrodes 20 each have a short side in the row direction (short-side direction) of the subpixel region SG and a long side in the column direction (long-side direction) of the subpixel region SG. As shown in FIG. 8A, common electrode lines 20*s* extending in the X direction are disposed at predetermined intervals in the Y direction on part of the common electrodes 20 and the first substrate 1. The common electrodes 20 are electrically connected to the common electrode lines 20*s*. Although not shown in the drawing, the common electrode lines 20*s* are electrically connected to the common potential terminal (COM terminal) at a predetermined position on the element substrate 91*x*. The gate lines 33 extending in the X direction are disposed at predetermined intervals in the Y direction. The gate lines 33 are disposed in the vicinity of the common electrode lines 20*s* provided corresponding to the adjacent unit pixels.

The gate insulating film 50 is disposed on the common electrodes 20, the common electrode lines 20*s*, the gate lines 33, and the first substrate 1. α-Si layers 26 serving as components of the α-Si TFTs 23 are disposed above the gate insulating film 50, and in the vicinity of intersections of the source lines 32 (described later) and the gate lines 33.

Referring to FIG. 8A, the source lines 32 extending in the Y direction are disposed on the gate insulating film 50. The source lines 32 have bent portions 32*x* that are bent so as to be superimposed on the α-Si layers 26 and to be electrically connected to the α-Si layers 26. Drain electrodes 34 are disposed on the α-Si layers 26 and the gate insulating film 50. The drain electrodes 34 are electrically connected to the α-Si layers 26. Therefore, the bent portions 32*x* of the source lines 32 are electrically connected to the drain electrodes 34 via the α-Si layers 26. In this manner, the α-Si TFTs 23 are formed in this region.

A passivation layer 54 made of silicon nitride (SiNx) or the like is disposed on the gate insulating film 50 and the α-Si TFTs 23. The passivation layer 54 has contact holes 54*a* at positions overlapping part of the common electrodes 20 and one end of the drain electrodes 34.

The pixel electrodes 10 made of ITO or the like are disposed in the corresponding subpixel regions SG on the passivation layer 54. The pixel electrodes 10 have a vertically long rectangle shape (vertical stripes), that is, the pixel electrodes 10 each have a short side 10S in the row direction, which is the direction in which the subpixels are arranged, and a long side 10L in the column direction, which is the direction in which the subpixels are arranged. The pixel electrodes 10 each have a plurality of slits 10*x*. The slits 10*x* are horizontal thin stripes extending in the row (horizontal) direction, which is the direction in which the subpixels are arranged. The direction in which a long side 10*xa* of each of the slits 10*x* extends is defined as a direction oriented at a predetermined angle with respect to the direction in which the short side 10S of each of the pixel electrodes 10 extends and the direction in which the gate lines 33 extend. The pixel electrodes 10 are electrically connected to the drain electrodes 34 via the contact holes 54*a*. Therefore, source signals (image signals) are supplied from the source lines 32 to the pixel electrodes 10 via the α-Si TFTs 23. An alignment film (not shown) is disposed on the pixel electrodes 10 and the like. The alignment film has been rubbed in the same direction as that in the first embodiment.

When the above-structured liquid crystal device 500 according to the comparative example is driven, the alignment of liquid crystal is controlled by the same principle as that of the liquid crystal device 100 according to the first embodiment, thereby performing a transmissive display operation.

The above-structured liquid crystal device 500 according to the comparative example has the following problems.

In the comparative example, as shown in FIG. 8A, the pixel electrodes 10 are formed as vertical stripes, and the slits 10*x* are defined as being tilted by a predetermined angle with respect to the direction in which the short side 10S of the pixel electrodes 10 extends and the direction in which the gate lines 33 extend. In the comparative example, it is thus necessary to dispose the slits 10*x* evenly throughout each of the pixel electrodes 10. Because of this structure, the number of slits 10*x* is increased. Application of a fringe field (electric field E) is changed in the vicinity of one of two ends of each of the slits 10x in the direction in which the long side 10xa extends in each pixel electrode 10, compared with other regions away from the end of the slit 10x. This results in a generation of a domain region DAr where liquid crystal molecules are hardly driven (liquid crystal alignment abnormal region). In the domain region DAr, brightness is reduced, and the domain region seems as a dark region when displayed. Phenomenally, the number of such domain regions DAr is the number of slits 10x, and such domain regions DAr are generated in an alternating zigzag pattern in the slits 10x adjacent in the Y direction. As in the comparative example, the larger the number of slits 10x in each of the pixel electrodes 10, the larger the number of domain regions DAr that do not contribute to brightness, and hence, the transmittance of the liquid crystal device is greatly reduced.

When the pixel structure is designed to reduce the number of slits 10x in each of the subpixels (pixel electrodes 10) as much as possible, the number of domain regions DAr can be reduced while maintaining an appropriate display state. Accordingly, the above-described problems can be alleviated.

In the first embodiment, each unit pixel includes four subpixels arranged in a two-by-two pattern. The shape of the pixel electrodes 10 corresponding to the subpixels is substantially square. Each of the pixel electrodes 10 has the plural slits 10x corresponding to one of the subpixel regions SG. The slits 10x are thin slits extending in the row (horizontal) direction, which is the direction in which the subpixels are arranged. The direction in which the long side 10xa of each of the slits 10x extends is defined to be different from the column direction, which is the direction in which the subpixels are arranged, and the direction in which the source lines 32 extend. In this example, the direction in which the long side 10xa of each of the slits 10x extends is defined as a direction oriented at a predetermined angle with respect to the row direction, which is the direction in which the subpixels are arranged, and the direction in which the gate lines 33 extend. Alternatively, the direction in which the long side 10xa of each of the slits 10x extends may be defined as the row direction, which is the direction in which the subpixels are arranged, and the direction in which the gate lines 33 extend.

Accordingly, the slits 10x are evenly disposed throughout each of the pixel electrodes 10, and the number of slits 10x is reduced in comparison with the comparative example. For example, in the comparative example, the number of slits 10x in each subpixel is eleven. In the first embodiment, the number of slits 10x in each subpixel is seven. According to the first embodiment with the structure described above, when liquid crystal is driven, as shown in FIG. 2A, domain regions DAr are generated in the vicinity of one of two ends of the slits 10x in the direction in which the long side 10xa extends. However, since the number of slits 10x in the pixel electrode 10 is reduced from that in the comparative example, the number of domain regions DAr is accordingly reduced in the first embodiment. As a result, a reduction in transmittance of the liquid crystal device 100 can be prevented.

In the first embodiment, as shown in FIG. 2A, the direction in which the long side 10xa of each of the slits 10x in each of the pixel electrodes 10 extends is defined to be substantially the same as the row direction, which is the direction in which the subpixels are arranged, and the direction in which the gate lines 33 extend. Thus, when liquid crystal is driven, a fringe field (electric field E) induced between the pixel electrodes 10 and the common electrode 20 is generated in the direction in which the source lines 32 extend. In the first embodiment, however, since the intervals of the subpixels adjacent in the direction in which the source lines 32 extend are greater than the intervals of the subpixels adjacent in the direction in which the gate lines 33 extend, with regard to arbitrary two subpixels adjacent in the direction in which the source lines 32 extend, the fringe field (electric field E) induced in one subpixel does not reach the other subpixel, and hence, the liquid crystal molecules of the other subpixel are not activated unnecessarily. In other words, with the above-described slit configuration, fringe fields (electric fields E) induced in arbitrary two subpixels adjacent in the direction in which the source lines 32 extend are prevented from influencing each other. Therefore, as a secondary advantage, the liquid crystal alignment is hardly disturbed at positions corresponding to the source lines 32. It is therefore unnecessary to dispose BMs at positions corresponding to the source lines 32 on the color filter substrate 92.

In the first embodiment, as has been described above, each unit pixel includes four subpixels arranged in a two-by-two pattern. In the unit pixel, two pixel electrodes 10 corresponding to two subpixels in the first row (that is, the pixel electrode 10 corresponding to the first row and the first column subpixel and the pixel electrode 10 corresponding to the first row and the second column subpixel) are electrically connected commonly to one gate line 33, and two pixel electrodes 10 corresponding to two subpixels in the second row (that is, the pixel electrode 10 corresponding to the second row and the first column subpixel and the pixel electrode 10 corresponding to the second row and the second column subpixel) are electrically connected commonly to another gate line 33. In the unit pixel, two pixel electrodes 10 corresponding to two subpixels in the first column (that is, the pixel electrode 10 corresponding to the first row and the first column subpixel and the pixel electrode 10 corresponding to the second row and the first column subpixel) are electrically connected commonly to one source line 32, and two pixel electrodes 10 corresponding to two subpixels in the second column (that is, the pixel electrode 10 corresponding to the first row and the second column subpixel and the pixel electrode 10 corresponding to the second row and the second column subpixel) are electrically connected commonly to another source line 32. According to the first embodiment, in the unit pixel, two subpixels positioned in the same row are sequentially scanned (two scanning operations) within the 1H period, thereby supplying image signals to the subpixels via the corresponding source lines 32.

In comparison with the liquid crystal device according to the above-described comparative example, the unit pixels are driven at a ratio twice as high as the drive duty ratio in the comparative example. As a result, the display quality is improved. The liquid crystal device according to the comparative example has unit pixels, each of which includes four subpixels arranged in a one-by-four (one row and four columns) pattern. In the unit pixel, the subpixels are electrically connected commonly to one gate line 33 and are electrically connected to the corresponding source lines 32. Therefore, according to the liquid crystal device, four subpixels in the unit pixel are scanned by one gate line within the 1H period, and video signals are supplied to the subpixels via the corresponding source lines 32 connected to the subpixels.

Second Embodiment

With reference to FIGS. 2B and 4, a liquid crystal device 200 according to a second embodiment of the invention will be described.

FIG. 2B shows the planar structure of one pixel of an element substrate 93 according to the second embodiment. In FIG. 2B, only the minimum components necessary for describing the element substrate 93 are shown. FIG. 4 is a cross-sectional view, taken along the line IV-IV of FIG. 2B, of one subpixel cut at the position across the LTPS TFT 21.

When the second embodiment is compared with the first embodiment, the main difference is that the positional relationship between the common electrode 20 and the pixel electrodes 10 with respect to the third insulating film 53 serving as a dielectric film on the element substrate is reversed, and the other structural portions are common in both embodiments. Therefore, components common to those in the first embodiment are denoted by the same reference numerals, and descriptions thereof are briefly given or omitted.

Specifically, the structure of a portion of the element substrate 93 different from the first embodiment will be described below.

In the second embodiment, each of the unit pixels includes four subpixels arranged in a two-by-two pattern, as in the first embodiment. The connections between the four subpixels in the unit pixel and the gate lines 33/source lines 32 are the same as those in the first embodiment. On the element substrate 93, the pixel electrodes 10 having a substantially square shape are disposed in the corresponding subpixel regions SG on the second insulating film 52, which is a planar film. In the unit pixel, the pixel electrodes 10 corresponding to the subpixels are set to have the same area. The positional relationship in plane among the pixel electrodes 10, the source lines 32, and the gate lines 33 is the same as that in the first embodiment. The pixel electrodes 10 are pulled into the corresponding contact holes 52a and are electrically connected to the corresponding relay electrodes 77. Therefore, video signals are supplied from the source lines 32 via the LTPS TFTs 21 to the pixel electrodes 10. The third insulating film 53, which is a dielectric film, is disposed on the pixel electrodes 10 and the second insulating film 52. The common electrode 20 is disposed as a solid electrode on the third insulating film 53. The common electrode 20 has a plurality of slits 20x corresponding to one of the subpixel regions SG. The slits 20x are thin slits extending in the row (horizontal) direction, which is the direction in which the subpixels are arranged. The direction in which a long side 20xa of each of the slits 20x extends is defined to be different from the column direction, which is the direction in which the subpixels are arranged, and the direction in which the source lines 32 extend. In this example, the direction in which the long side 20xa of each of the slits 20x extends is defined as a direction oriented at a predetermined angle with respect to the row direction, which is the direction in which the subpixels are arranged, and the direction in which the gate lines 33 extend. Alternatively, the direction in which the long side 20xa of each of the slits 20x extends may be defined as the row direction, which is the direction in which the subpixels are arranged, and the direction in which the gate lines 33 extend. In this example, a short side (reference numeral thereof is omitted) of each of the slits 20x, which is continuous from the long side 20xa of each of the slits 20x, has a curved shape. However, the shape of the short side is not limited thereto, and, for example, the short side may be a straight line. In each of the subpixel regions SG, the common electrode 20 has a notch portion 20xb continuous to one end of the slit 20x, among the slits 20x, which is positioned in the vicinity of the contact hole 52a. The notch portion 20xb has an area larger than that of the contact hole 52a and is disposed at a position corresponding to the contact hole 52a.

In the above-structured liquid crystal device 200 according to the second embodiment, each unit pixel includes four subpixels arranged in a two-by-two pattern. The pixel electrodes 10 corresponding to the subpixels have a substantially square shape. The common electrode 20 has the slits 20x corresponding to one of the subpixels. The slits 20x are thin slits extending in the row (horizontal) direction, which is the direction in which the subpixels are arranged. The direction in which the long side 20xa of each of the slits 20x extends is defined to be different from the column direction, which is the direction in which the subpixels are arranged, and the direction in which the source lines 32 extend. In this example, the direction in which the long side 20xa of each of the slits 20x extends is defined as a direction oriented at a predetermined angle with respect to the row direction, which is the direction in which the subpixels are arranged, and the direction in which the gate lines 33 extend.

Accordingly, the slits 20x are evenly arranged throughout the common electrode 20, and the number of slits 20x is reduced from that in a comparative example described below. In this comparative example, the cross section has the structure in which the positional relationship between the common electrode 20 and the pixel electrodes 10 with respect to the third insulating film 53 is reversed from that in the aforementioned comparative example. The slits 20x in the common electrode 20 are horizontal thin stripes extending in the row (horizontal) direction, which is the direction in which the subpixels are arranged, and the direction in which the long side 20xa of each of the slits 20x extends is defined as the direction in which the short side 10S of each of the pixel electrodes 10 extends and the direction in which the gate lines 33 extend. Alternatively, the direction in which the long side 20xa of each of the slits 20x extends may be defined as a direction oriented at a predetermined angle with respect to the direction in which the short side 10S of each of the pixel electrodes 10 extends and the direction in which the gate lines 33 extend. According to the second embodiment with the structure described above, when liquid crystal is driven, as shown in FIG. 2B, domain regions DAr are generated in the vicinity of one of two ends of the slits 20x in the direction in which the long side 20xa extends. However, since the number of slits 20x in the common electrode 20 is reduced from that in the comparative example assumed here, the number of domain regions DAr is reduced. As a result, a reduction in transmittance of the liquid crystal device 200 can be prevented.

According to the second embodiment, as shown in FIG. 2B, the direction in which the long side 20xa of each of the slits 20x in the common electrode 20 extends is defined to be substantially the same as the row direction, which is the direction in which the subpixels are arranged, and the direction in which the gate lines 33 extend. Thus, when liquid crystal is driven, a fringe field (electric field E) induced between the pixel electrodes 10 and the common electrode 20 is generated in the direction in which the source lines 32 extend. In the second embodiment, however, as in the first embodiment, the intervals of the subpixels adjacent in the direction in which the source lines 32 extend are greater than the intervals of the subpixels adjacent in the direction in which the gate lines 33 extend. With regard to arbitrary two-subpixels adjacent in the direction in which the source lines 32 extend, the fringe field (electric field E) induced in one subpixel does not reach the other subpixel, and hence, the liquid crystal molecules of the other subpixel are not activated unnecessarily. In other words, with the above-described slit configuration, fringe fields (electric fields E) induced in arbitrary two subpixels adjacent in the direction in which the source lines 32 extend are prevented from influencing each other.

According to the second embodiment, each unit pixel includes four subpixels arranged in a two-by-two pattern, as has been described above. In the unit pixel, the connections between two pixel electrodes 10 corresponding to two subpixels in the first row and the gate lines 33/source lines 32 and the connections between two pixel electrodes 10 corresponding to two subpixels in the second row and the gate lines 33/source lines 32 are the same as those in the above-described first embodiment. Therefore, according to the second embodiment, in the unit pixel, two subpixels positioned in the same row are sequentially scanned (two scanning operations) within the 1H period, thereby supplying image signals to the subpixels via the corresponding source lines 32. Hence, the same advantages as those in the first embodiment can be achieved.

Modifications

In the first and second embodiments described above, four subpixels in each unit pixel are set to have substantially the same area. However, the invention is not limited to such a case, and if needed, four subpixels in each unit pixel may have different areas in order to adjust the white balance (color adjustment). Such a structure will be described with reference to FIGS. 9A, 9B, 10A, and 10B. In the following description, the same components as those in the first embodiment are denoted by the same reference numerals, and descriptions thereof are briefly given or omitted.

Figure 10A:
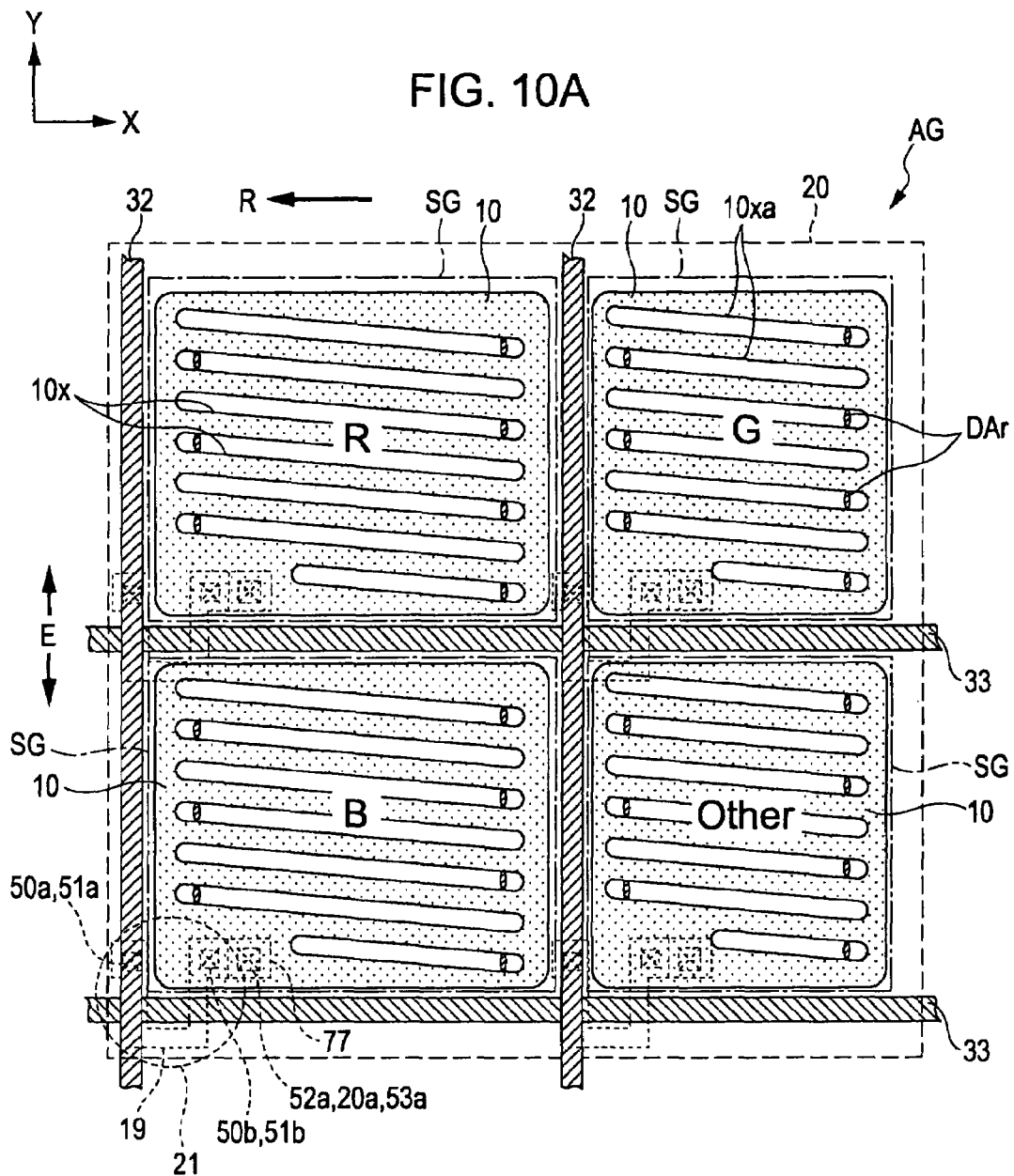

FIGS. 9A and 10A show the pixel structure corresponding to that shown in FIG. 2A, namely, the planar structure of one pixel according to modifications in which the areas of four subpixels in the unit pixel are different. FIGS. 9B and 10B show the pixel structure corresponding to that shown in FIG. 2B, namely, the planar structure of one pixel according to modifications in which the areas of four subpixels in the unit pixel are different.

In the modifications shown in FIGS. 9A, 9B, 10A, and 10B, the unit pixel includes four subpixels arranged in a two-by-two pattern, as in the first embodiment. Note that, in the unit pixel, among the pixel electrodes 10 corresponding to the red (R), green (G), blue (B) and other-color (O) subpixels, the area of the pixel electrode 10 corresponding to at least one subpixel is set to be different from the areas of the pixel electrodes 10 corresponding to the other subpixels.

The pixel structure and the like according to the modifications shown in FIGS. 9A and 9B will be described. The cross section of the modification shown in FIG. 9A corresponds to the cross section of the first embodiment shown in FIG. 2A, and the cross section of the modification shown in FIG. 9B corresponds to the cross section of the second embodiment shown in FIG. 2B.

According to the modifications shown in FIGS. 9A and 9B, in the unit pixel, the areas of subpixels arranged in the same column in the Y direction or the vertical direction are set to be different. Specifically, according to the modifications shown in FIGS. 9A and 9B, in the unit pixel, the area of the pixel electrode 10 corresponding to the red (R) subpixel is set to be different in comparison to the area of the pixel electrode 10 corresponding to the blue (B) subpixel. At the same time, the area of the pixel electrode 10 corresponding to the green (G) subpixel is set to be different in comparison to the area of the pixel electrode 10 corresponding to the other-color (O) subpixel.

In the modifications shown in FIGS. 9A and 9B, instead of four subpixels in the unit pixel having the same area, the areas of the subpixels in the unit pixel are changed, if needed, as has been described above. Accordingly, the white balance can be adjusted.

According to the first embodiment, in the unit pixel, the gate line 33 for driving the red (R) subpixel positioned in the first row and the first column and the green (G) subpixel positioned in the first row and the second column is disposed between these red (R) and green (G) subpixels and the blue (B) subpixel positioned in the second row and the first column and the other-color (O) subpixel positioned in the second row and the second column. In contrast, according to the modifications shown in FIGS. 9A and 9B, the gate line 33 for driving the red (R) subpixel positioned in the first row and the first column and the green (G) subpixel positioned in the first row and the second column is disposed between these red (R) and green (G) subpixels and the blue (B) subpixel positioned in the second row and the first column and the other-color (O) subpixel positioned in the second row and the second column in another unit pixel (not shown) adjacent in the Y direction to the red (R) and green (G) subpixels. Accordingly, as in the first embodiment, the unit pixels are driven at a ratio twice as high as the drive duty ratio in the aforementioned comparative example. As a result, the display quality is improved. Note that the remaining structure of the modifications shown in FIGS. 9A and 9B is the same as that in the first embodiment.

The pixel structure according to modifications shown in FIGS. 10A and 10B will be described. The cross section of the modification shown in FIG. 10A corresponds to the cross section of the first embodiment shown in FIG. 2A, and the cross section of the modification shown in FIG. 10B corresponds to the cross section of the second embodiment shown in FIG. 2B.

According to the modifications shown in FIGS. 10A and 10B, in the unit pixel, the areas of subpixels arranged in the same row in the X direction or the horizontal direction are set to be different. Specifically, according to the modifications shown in FIGS. 10A and 10B, in the unit pixel, the area of the pixel electrode 10 corresponding to the red (R) subpixel is set to be different in comparison to the area of the pixel electrode 10 corresponding to the green (G) subpixel. At the same time, the area of the pixel electrode 10 corresponding to the blue (B) subpixel is set to be different in comparison to the area of the pixel electrode 10 corresponding to the other-color (O) subpixel.

In the modifications shown in FIGS. 10A and 10B, as in the modifications shown in FIGS. 9A and 9B, the areas of the subpixels in the unit pixel are changed, if needed, as has been described above. Accordingly, the white balance can be adjusted. In the modifications shown in FIGS. 10A and 10B, the positional relationship among four subpixels in each unit pixel and two gate lines 33 for driving the corresponding subpixels and the other structure are the same as those in the first embodiment.

Although each unit pixel includes subpixels arranged in a two-by-two pattern in the above-described various embodiments, the invention is not limited thereto. Each unit pixel may include a plurality of subpixels arranged in a pattern having a plurality of rows and a plurality of columns.

Figure 11:
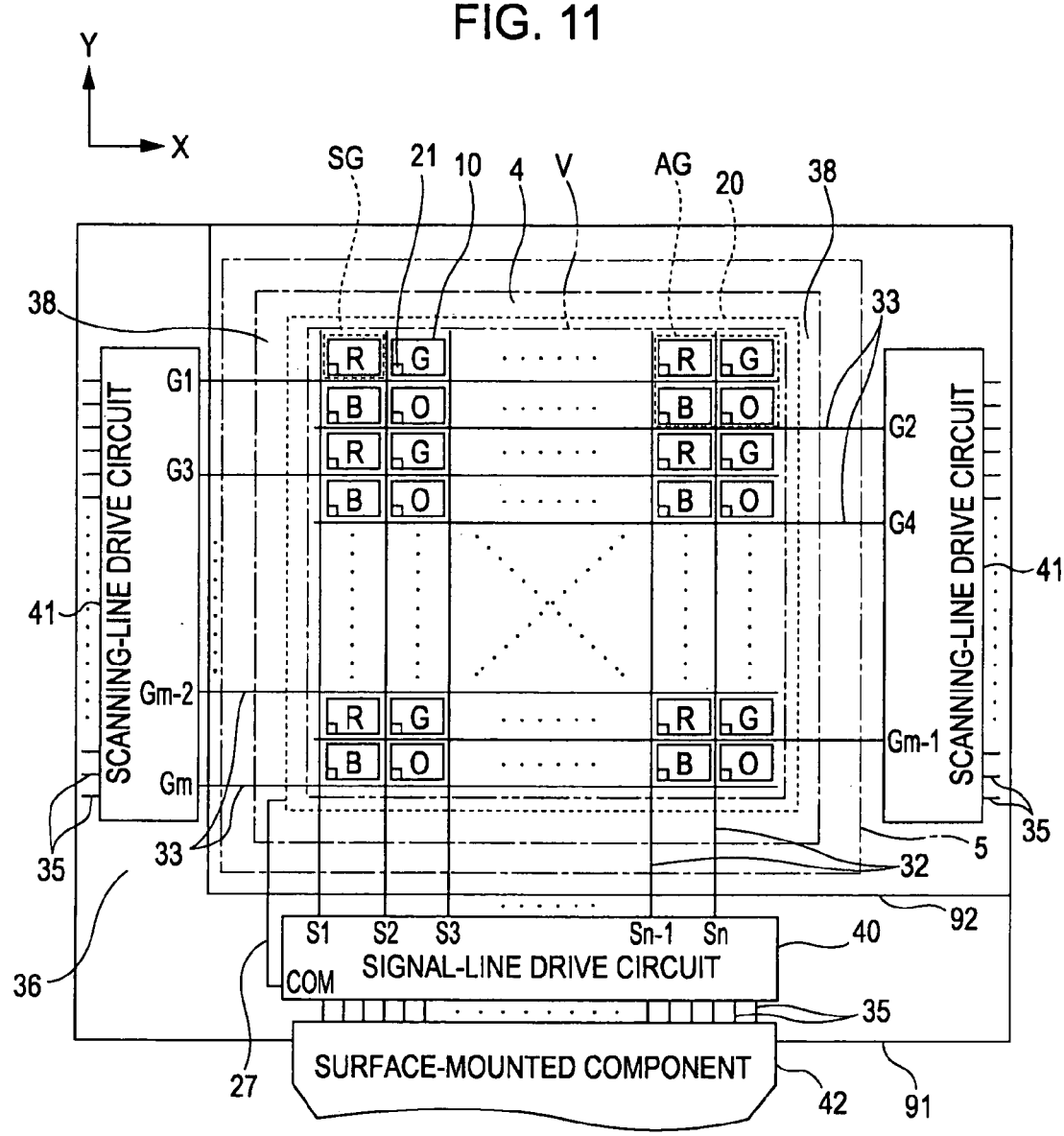
FIG. 11 is a plan view schematically showing the structure of another modification having two signal-line drive circuits.

Although only one scanning-line drive circuit 41 is provided and the gate lines 33 are arranged extending from the scanning-line drive circuit 41 to the subpixels in the above-described various embodiments, the invention is not limited thereto. As shown in FIG. 11, two scanning-line drive circuits 41 may be provided so as to sandwich the effective display region V, and the gate lines 33 may be arranged extending alternately from the scanning-line drive circuits 41 to the subpixels.

The structure of the signal-line drive circuit 40 is not limited to that of the first embodiment described above. For example, the signal-line drive circuit 40 may include various known circuits, such as a dot-sequential drive circuit for sequentially writing image information into subpixels, one at a time, via the source lines 32.

If there is no problem with the time constant of the common electrode 20, in the various embodiments and modifications, common electrode lines made of metal films or the like may be disposed at appropriate positions, and the common electrode 20 may be connected via the common electrode lines to the common potential terminal (COM terminal).

Although the invention has been applied to the transmissive liquid crystal device in the various embodiments and modifications, the invention is not limited thereto. The invention may be applicable to a reflective liquid crystal device or a semi-transmissive reflective liquid crystal device.

Although the invention has been applied to the liquid crystal device having the LTPS TFTs 21 in the various embodiments and modifications, the invention is not limited thereto. Without departing from the scope of the invention, the invention may be applicable to three-terminal elements represented by P—Si TFTS or α-Si TFTs or to two-terminal non-linear elements represented by TFDs.

Various modifications can be made without departing from the scope of the invention.

Other Embodiments

In the above description of the first and second embodiments and various modifications, the case in which four colored regions include red (R), green (G), blue (B), and other color (O) has been described. However, the invention is not limited to these four colored regions, and one pixel region may include other four colored regions.

In this case, the four colored regions include, within a visible light region (380 to 780 nm) where hue changes according to wavelength, a bluish hue colored region (may also be referred to as a "first colored region"), a reddish hue colored region (may also be referred to as a "second colored region"), and two hue colored regions selected from among hues ranging from blue to yellow (may also be referred to as a "third colored region" and a "fourth colored region"). The word "-ish" is used because, for example, the bluish hue is not limited to pure blue and includes violet, blue green, and the like. The reddish hue is not limited to red and includes orange. Each of the colored regions may be formed by using a single colored layer or by stacking a plurality of colored layers of different hues. Although the colored regions are described in terms of hue, hue is the color that can be set by appropriately changing the saturation and the brightness.

The specific range of each hue is as follows:
the bluish hue colored region ranges from violet to blue green, and more preferably ranges from indigo to blue;
the reddish hue colored region ranges from orange to red;
one of the two colored regions selected from among hues ranging from blue to yellow ranges from blue to green, and more preferably ranges from blue green to green; and
the other colored region selected from among hues ranging from blue to yellow ranges from green to orange, and more preferably ranges from green to yellow or from green to yellow green.

The colored regions do not use the same hue. For example, when greenish hues are used in the two colored regions selected from among hues ranging from blue to yellow, a green hue is used in one region, while a bluish hue or a yellow greenish hue is used in the other region.

Accordingly, a wider range of colors can be reproduced, compared with known RGB colored regions.

Although the wide range of color reproduction using the four colored regions has been described in terms of hue, the colored regions may be described in terms of the wavelength of light passing therethrough:
the bluish colored region is a colored region where the peak of the wavelength of light passing therethrough is within 415-500 nm, and more preferably within 435-485 nm;
the reddish colored region is a colored region where the peak of the wavelength of light passing therethrough is greater than or equal to 600 nm, and more preferably greater than or equal to 605 nm;
one of the two colored regions selected from among hues ranging from blue to yellow is a colored region where the peak of the wavelength of light passing therethrough is within 485-535 nm, and more preferably within 495-520 nm; and
the other colored region selected from among hues ranging from blue to yellow is a colored region where the peak of the wavelength of light passing therethrough is within 500-590 nm, and more preferably within 510-585 nm or within 530-565 nm.

These wavelengths are, in the case of transmissive display, values obtained by allowing illumination light emitted from a lighting device to pass through color filters, and, in the case of reflective display, values obtained by allowing external light to be reflected.

The four colored regions may be described in terms of the x-y chromaticity diagram:
the bluish colored region is a colored region where $x \leq 0.151$ and $y \leq 0.200$, and more preferably $0.134 \leq x \leq 0.151$ and $0.034 \leq y \leq 0.200$;
the reddish colored region is a colored region where $0.520 \leq x$ and $y \leq 0.360$, and more preferably $0.550 \leq x \leq 0.690$ and $0.210 \leq y \leq 0.360$;
one of the two colored regions selected from among hues ranging from blue to yellow is a colored region where $x \leq 0.200$ and $0.210 \leq y$, and more preferably $0.080 \leq x \leq 0.200$ and $0.210 \leq y \leq 0.759$; and
the other colored region selected from among hues ranging from blue to yellow is a colored region where $0.257 \leq x$ and $0.450 \leq y$, and $0.257 \leq x \leq 0.520$ and $0.450 \leq y \leq 0.720$.

The x-y chromaticity diagram shows, in the case of transmissive display, values obtained by allowing illumination light emitted from a lighting device to pass through color filters, and, in the case of reflective display, values obtained by allowing external light to be reflected.

When subpixels have transmissive regions and reflective regions, the four colored regions are also applicable to the transmissive regions and the reflective regions within the above-described ranges.

When the four colored regions in this example are used, a light emitting diode (LED), a fluorescent lamp, or an organic electro-luminescence (organic EL) may be used as a backlight for RGB light sources. Alternatively, a white light source may be used. The white light source may be one generated using a blue lighting device and an yttrium aluminum garnet (YAG) phosphors.

Preferably, the RGB light sources are as follows:
for B, the peak of the wavelength is within 435-485 nm;
for G, the peak of the wavelength is within 520-545 nm; and
for R, the peak of the wavelength is within 610-650 nm. By appropriately selecting the above-described colored layers on the basis of the wavelengths of the RGB light sources, a wide range of colors can be reproduced. Alternatively, a light source where the wavelength has a plurality of peaks, such as at 450 nm and 565 nm, may be used.

Specifically, the four colored regions may include:
- colored regions where the hues are red, blue, green, and cyan (blue green);
- colored regions where the hues are red, blue, green, and yellow;
- colored regions where the hues are red, blue, dark green, and yellow;
- colored regions where the hues are red, blue, emerald green, and yellow green;
- colored regions where the hues are red, blue, emerald green, and yellow; and
- colored regions where the hues are red, blue, dark green, and yellow green.

Electronic Apparatus

Specific examples of electronic apparatuses to which the liquid crystal device according to the above-described various embodiments is applicable will be described with reference to FIGS. 12A and 12B.

The first example in which the liquid crystal device according to the above-described various embodiments is applied to a display unit of a portable personal computer (so-called "notebook personal computer") will be described. FIG. 12A is a perspective view of the structure of the personal computer. As shown in FIG. 12A, a personal computer 710 includes a main unit 712 with a keyboard 711 and a display unit 713 to which the liquid crystal device according to the embodiments of the invention is applied as a panel.

The next example in which the liquid crystal device according to the above-described various embodiments is applied to a display unit of a cellular phone will be described. FIG. 12B is a perspective view of the structure of the cellular phone. As shown in FIG. 12B, a cellular phone 720 includes a plurality of operation buttons 721, an earpiece 722, a mouthpiece 723, and a display unit 724 to which the liquid crystal device according to the embodiments of the invention is applied.

Figure 12A:
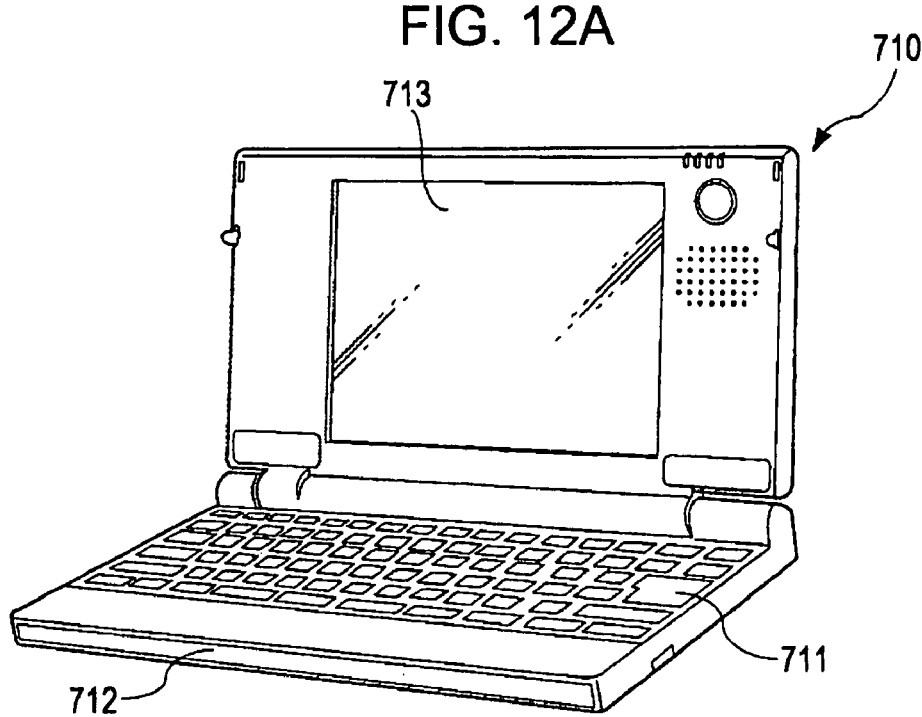
FIGS. 12A and 12B show exemplary electronic apparatuses to which the liquid crystal device according to the embodiments of the invention are applied.
Figure 12B:
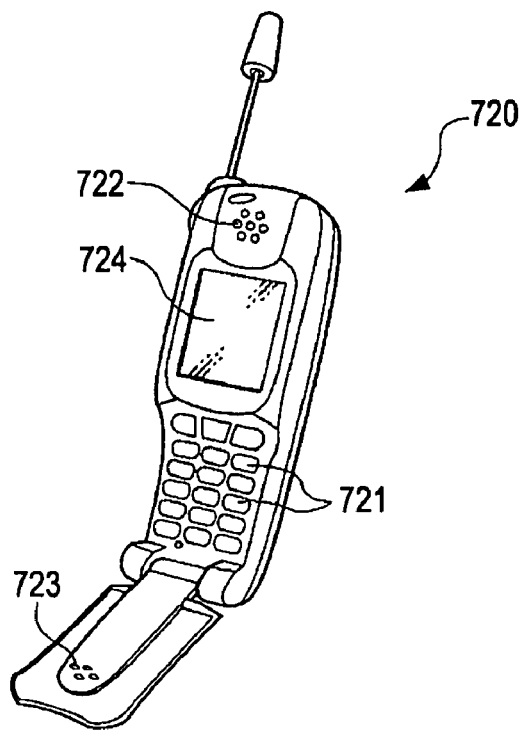

Electronic apparatuses to which the liquid crystal device according to the embodiments of the invention is applicable include, besides the personal computer shown in FIG. 12A and the cellular phone shown in FIG. 12B, a liquid crystal television, a video tape recorder of the viewfinder type or monitor direct viewing type, a car navigation system, a pager, an electronic organizer, an electronic calculator, a word processor, a workstation, a videophone, a point-of-sale (POS) terminal, and a digital still camera.

The entire disclosure of Japanese Patent Application No. 2006-90375, filed Mar. 29, 2006 is expressly incorporated by reference herein.

What is claimed is:

1. A liquid crystal device comprising:
    a substrate having unit pixels, each of which includes a plurality of subpixels arranged in a plurality of rows and a plurality of columns,
    the substrate including:
        switching elements,
        a first insulating film disposed at least on the switching elements,
        a first transparent electrode disposed on the first insulating film,
        a second insulating film disposed on the first transparent electrode, and
        a second transparent electrode disposed on the second insulating film, having a plurality of slits corresponding to each one of the subpixels, and generating an electric field through the slits between the first and second transparent electrodes,
    the direction in which a long side of each of the slits extends being defined to be different from the direction in which the columns extend,
    the first transparent electrode being a common electrode connected to a common potential, and the second transparent electrode being a unit subpixel electrode that is disposed for each one of the subpixels and that is electrically connected to a corresponding one of the switching elements via contact holes in the first and second insulating films.

2. The liquid crystal device according to claim 1,
    the direction in which the long side of each of the slits extends being defined as the direction in which the rows extend or a direction oriented at a predetermined angle with respect to the direction in which the rows extend.

3. The liquid crystal device according to claim 1, further comprising:
    a plurality of first lines extending in the direction in which the columns extend and a plurality of second lines extending in the direction in which the rows extend, the first and second lines being electrically connected to the switching elements, and
    the direction in which the long side of each of the slits extends being defined as the direction in which the second lines extend or a direction oriented at a predetermined angle with respect to the direction in which the second lines extend.

4. An electronic apparatus comprising a liquid crystal device as set forth in claim 1 as a display unit.

5. The liquid crystal device according to claim 1,
    the first transparent electrode being a unit subpixel electrode that is disposed for each one of the subpixels and that is electrically connected to a corresponding one of the switching elements via a contact hole in the first insulating film, and the second transparent electrode being a common electrode connected to a common potential.

6. The liquid crystal device according to claim 1, further comprising:
    a counter substrate facing the substrate with liquid crystal disposed therebetween, and
    a colored layer of an arbitrary single color being disposed on the counter substrate at each of positions corresponding to the subpixels in each of the unit pixels, and the areas of the subpixels being set to be the same.

7. The liquid crystal device according to claim 1, further comprising:
    a counter substrate facing the substrate with liquid crystal disposed therebetween,
    a colored layer of an arbitrary single color being disposed on the counter substrate at each of positions corresponding to the subpixels in each of the unit pixels, and, among the plurality of subpixels, the area of at least one of the subpixels being set to be different from the areas of the other subpixels.

8. The liquid crystal device according to claim 7, in the unit pixel, the areas of the subpixels arranged in the same row or the areas of the subpixels being arranged in the same column are set to be different.

9. The liquid crystal device according to claim 1, the electric field having electric field components in a direction substantially parallel and in a direction substantially orthogonal to the substrate.

* * * * *